(12) United States Patent
Pilnock et al.

(10) Patent No.: US 11,044,281 B2
(45) Date of Patent: Jun. 22, 2021

(54) VIRTUAL THREE-DIMENSIONAL USER INTERFACE OBJECT HAVING A PLURALITY OF SELECTION OPTIONS ON ITS OUTER SURFACE FOR INTERACTING WITH A SIMULATED ENVIRONMENT, AND SYSTEM FOR PROVIDING A SIMULATED ENVIRONMENT THAT USES SAME

(71) Applicant: 8 Bit Development Inc., Mesa, AZ (US)

(72) Inventors: Eric M. Pilnock, Mesa, AZ (US); Kenneth E. Irwin, Jr., Dawsonville, GA (US); Michael T. Day, Mesa, AZ (US); Michael Pilnock, Maricopa, AZ (US)

(73) Assignee: 8 BIT DEVELOPMENT INC., Mesa, AZ (US)

( * ) Notice: Subject to any disclaimer, the term of this patent is extended or adjusted under 35 U.S.C. 154(b) by 0 days.

(21) Appl. No.: 16/866,013

(22) Filed: May 4, 2020

(65) Prior Publication Data

US 2020/0267194 A1 Aug. 20, 2020

Related U.S. Application Data

(63) Continuation of application No. 16/549,605, filed on Aug. 23, 2019, now Pat. No. 10,645,126.

(Continued)

(51) Int. Cl.
*G06Q 30/02* (2012.01)
*H04L 29/06* (2006.01)
(Continued)

(52) U.S. Cl.
CPC .......... *H04L 65/4015* (2013.01); *G06F 9/451* (2018.02); *G06F 16/2264* (2019.01);
(Continued)

(58) Field of Classification Search
CPC ............... H04L 29/08072; H04L 29/06; H04L 29/0809; H04L 29/08981; G06Q 30/02
(Continued)

(56) References Cited

U.S. PATENT DOCUMENTS 8,717,294 B2  5/2014  Weising et al.
8,730,156 B2  5/2014  Weising et al.
(Continued)

*Primary Examiner* — Gordon G Liu
(74) *Attorney, Agent, or Firm* — Panitch Schwarze Belisario & Nadel LLP

(57) ABSTRACT

A virtual user interface for a user-controlled device is provided that allows a person who is associated with the user-controlled device to make user selections from a plurality of selection options to interact with a simulated environment. The virtual user interface is a virtual three-dimensional user interface object having the plurality of selection options on its outer surface. The plurality of selection options is distributed over different portions of the outer surface of the virtual three-dimensional user interface object, and the plurality of selection options are grouped into a plurality of subsets of selection options. The virtual three-dimensional user interface object is rotatable by user interaction of the person with the virtual three-dimensional user interface object to a predefined position in space that causes one of the subsets of selection options to be in focus, thereby enabling the selection options of the subset in focus to be enabled for user selection. The remaining subsets of selection options are not in focus and thus are not enabled for user selection.

17 Claims, 19 Drawing Sheets

Related U.S. Application Data

(60) Provisional application No. 62/721,689, filed on Aug. 23, 2018.

(51) Int. Cl.

| | | |
|---|---|---|
| *G06T 11/00* | (2006.01) | |
| *G06F 9/451* | (2018.01) | |
| *G06F 21/56* | (2013.01) | |
| *G06F 21/53* | (2013.01) | |
| *G06F 16/22* | (2019.01) | |
| *G07F 17/32* | (2006.01) | |

(52) U.S. Cl.
CPC ............ *G06F 21/53* (2013.01); *G06F 21/566* (2013.01); *G06T 11/00* (2013.01); *H04L 67/38* (2013.01); *G06F 2221/033* (2013.01); *G07F 17/3225* (2013.01); *G07F 17/3293* (2013.01)

(58) Field of Classification Search
USPC ......................................................... 709/217
See application file for complete search history.

(56) References Cited

U.S. PATENT DOCUMENTS

| | | |
|---|---|---|
| 9,310,883 B2 | 4/2016 | Weising et al. |
| 9,766,703 B2 | 9/2017 | Miller |
| 9,846,972 B2 | 12/2017 | Montgomerie et al. |
| 2001/0028369 A1* | 10/2001 | Gallo .................... G06F 16/954 715/848 |
| 2002/0194056 A1* | 12/2002 | Summers ................ G09B 5/00 703/10 |
| 2004/0038740 A1 | 2/2004 | Muir |
| 2007/0011617 A1* | 1/2007 | Akagawa ................ G06T 19/00 715/738 |
| 2013/0203489 A1 | 8/2013 | Lyons |
| 2013/0249947 A1 | 9/2013 | Reitan |
| 2014/0128161 A1 | 5/2014 | Latta et al. |
| 2016/0350973 A1 | 12/2016 | Shapira et al. |
| 2017/0105052 A1 | 4/2017 | DeFaria et al. |
| 2017/0243403 A1 | 8/2017 | Daniels et al. |
| 2018/0158245 A1 | 6/2018 | Govindan |
| 2018/0308377 A1* | 10/2018 | Pena-Rios ............ G06Q 10/101 |

\* cited by examiner

VIRTUAL THREE-DIMENSIONAL USER INTERFACE OBJECT HAVING A PLURALITY OF SELECTION OPTIONS ON ITS OUTER SURFACE FOR INTERACTING WITH A SIMULATED ENVIRONMENT, AND SYSTEM FOR PROVIDING A SIMULATED ENVIRONMENT THAT USES SAME

CROSS-REFERENCE TO RELATED APPLICATION

This application is a continuation of copending U.S. patent application Ser. No. 16/549,605 filed Aug. 23, 2019, which is incorporated by reference herein.

This application claims the benefit of U.S. Patent Application No. 62/721,689 filed Aug. 23, 2018, the disclosure of which is hereby incorporated by reference herein in its entirety.

FIELD OF THE INVENTION

The present invention relates to a system and method for allowing a plurality of users to each individually collaboratively interact with a common virtual simulated environment utilizing a plurality of different devices—e.g., Two-Dimensional (2D) computer screen and mouse, Three-Dimensional (3D) Virtual Reality (VR) goggles, Augmented Reality (AR) enabled smart phones, game consoles. Both real and asynchronized time collaboration are enabled by this invention. Ideally, the inherent aspects of this invention also enable security countermeasures, thereby protecting the common collaborative simulated environment from alteration by malicious users.

BACKGROUND

While still in its infancy, the popularity of both virtual and augmented reality is rapidly increasing. The Virtual Reality (VR) industry started by providing devices for medical, flight simulation, automobile industry design, and military training purposes around 1970. The 1990s saw the first widespread commercial releases of consumer headsets—e.g., in 1991, Sega announced the Sega VR headset for arcade games and the Mega Drive console. By 2016 there were at least 230 companies developing VR-related products. Facebook currently has around 400 employees focused on VR development; Google, Apple, Amazon, Microsoft, Sony, and Samsung all have dedicated VR and Augmented Reality (AR) groups.

The first commercial AR experiences were used largely in the entertainment and gaming businesses, but now other industries are also developing AR applications—e.g., knowledge sharing, educating, managing information, organizing distant meetings, telemedicine. Augmented reality is also transforming the world of education, where content may be accessed by scanning or viewing an image with a mobile device. Probably the most popular example of AR is the game "Pokémon Go", which was released to the public in July of 2016.

Thus, a nascent industry is emerging in the form of VR and AR systems. However, prior art VR and AR systems are limited in that they require extensive simulated and actual environmental specifications typically limiting a given simulation to a single proprietary platform. In addition, prior art VR and AR systems are limited in their ability to allow multiple users to share a common simulated environment in a collaborative fashion or to allow another user to view and manipulate a simulated environment of a first user.

Multiple attempts have been made to alleviate the problem of VR and/or AR collaboration across multiple users, albeit only across a common platform—e.g., U.S. Pat. Nos. 8,717,294; 8,730,156; 9,310,883; (all "Weising et al."); U.S. Pat. No. 9,766,703 ("Miller"); and U.S. Pat. No. 9,846,972 ("Montgomerie et. al"). While "Weising et. al" in its various embodiments teaches providing AR views through a plurality of devices, it assumes a homogeneous collection of AR viewing devices of the same type and is completely silent as to how multiple users can securely be empowered to virtually manipulate a common object. These same basic concepts are taught in different embodiments in "Miller" with more emphasis on pluralities of users manipulating common virtual objects, however like "Weising et. al", "Miller" remains completely silent on how to provide a secure environment for multiple user manipulations. "Montgomerie et. al" also teaches providing AR views through a plurality of devices from different perspectives while allowing different users to "annotate" common objects, again with no regard to providing security across the plurality of users.

U.S. Patent Application Publication No. 2016/0350973 ("Shapira et al.") discloses the creation of a "Shared Tactile Immersive Virtual Environment Generator" (STIVE Generator) wherein multiple VR users share tactile interactions via virtual elements. Similar to previously disclosed prior art embodiments, "Shapira et. al" is completely silent on cross platform compatibility and security concerns for multiple users, additionally the STIVE Generator as envisioned by "Shapira et. al" requires close proximity to real world objects for all users. U.S. Patent Application Publication No. 2017/0105052 ("DeFaria et al.") discloses an entertainment system providing data to a common screen (e.g., cinema screen) and personal immersive reality devices. While "DeFaria et al." does at least acknowledge the possibility of multiple platforms (e.g., AR and VR) processing and displaying the same entertainment, the distributed data is relatively simplistic with the users relegated to a passive viewing of the data with no ability to alter the content. Finally, U.S. Patent Application Publication No. 2017/0243403 ("Daniels et al.") teaches utilizing onsite and offsite devices for generating AR representations of a real-world location. Again, "Daniels et. al" is completely silent on cross platform compatibility and security concerns for multiple users.

Additionally, numerous attempts have been made regarding varying implementations of cross platform sharing of a common model. For example, U.S. Patent Application Nos. 2004/0038740 ("Muir"); 2013/0203489 ("Lyons"); and 2014/0128161 ("Latta et al.") all are concerned with varying degrees of cross platform sharing of a common model. "Muir" discloses the concept of a gaming architecture divided into two primary portions (e.g., paragraph [0018]) where one portion is comprised of a "platform interface" with the other portion comprising a "game program", which includes a plurality of functional modules that interact via the platform interface. However, "Muir" only addresses cross platform compatibility for two-dimensional gaming environments (e.g., "standalone Electronic Gaming Machines" or "EGMs"—a.k.a. slot machines, TV, handheld) and is completely silent on the vexing problems of providing cross platform compatibility across multiple dimensional devices (e.g., two-dimensional screens, "Augmented Reality" or "AR", "Virtual Reality" or "VR"). "Lyons" teaches a method for reformatting original graphic content designed for presentation on a gaming machine (slot machine) on a mobile computing device; but, again fails to address providing cross platform compatibility across multiple dimensional devices. Finally, "Latta et al." discloses a server system joining various computing platforms (including AR devices) to assorted multiplayer gaming sessions. However, "Latta et al." is completely silent on security as well as the details of marrying different types of devices to a common database.

Thus, the prior art mostly fails to address the problem of secure cross platform compatibility in a collaborative environment. Specifically, the prior art completely fails to address the vexing problem of supporting VR, AR, game consoles, and two-dimensional (i.e., computer displays and personal tablets) device collaboration in a secure manner with a common simulated environment. When it is understood that multiple manufacturers (e.g., Apple, Microsoft, Google, Sony, Samsung) only support their own proprietary formats, it becomes apparent that cross device and/or platform collaboration is limited at best with each manufacturer attempting to create their own "walled gardens" in a perceived "winner take all" intellectual property competition, where the one or two winning manufacturers dominate the future VR and AR industry. Embodiments of the present invention address these differences.

SUMMARY OF THE INVENTION

Objects and advantages of the present invention will be set forth in part in the following description, or may be obvious from the description, or may be learned through practice of the present invention.

A method and system are provided for a collaborative VR, AR, and/or 2D common virtual simulated environment for a plurality of users, wherein each user experiences the shared simulated environment from an individual perspective that is compatible with the user's chosen device and platform. This secure cross device and platform compatibility is principally made possible by a central server maintaining a collaborative virtual Superposition Simulated Environment (SSE), also referred to herein as a "collaborative simulated environment," where all data necessary for each of the plurality of supported devices is stored and updated real time in a common layered multidimensional database with customized (i.e., unique) device specific drivers created for each device accessing the SSE database. As a consequence of this plurality of platform support, the collaborative SSE database will most likely contain extraneous data for any given user device with the filtering of extraneous data primarily accomplished through the multidimensional layered structure of the SSE database.

Described are mechanisms, systems, and methodologies related to constructing a collaborative layer structured SSE database, thereby enabling pluralities of different user devices and platforms (e.g., VR devices, AR devices including smart phones, two-dimensional computer screens and mouse, two-dimensional touch pads) to all access and modify the same SSE database at the same time or at different times. In a general embodiment, a central (e.g., cloud based) SSE database is disclosed that provides separate user collaborative interfaces to the SSE database while accommodating a plurality of different devices and platforms. The separate user interfaces typically provide views of the SSE database from different perspectives. Each user interface is also typically empowered with the ability to alter and manipulate the SSE database in a collaborative manner. To readily accommodate selective filtering of generic SSE database data to a plurality of different user devices and platforms, the SSE database is structured with multidimensional layering where different layers embody different sets of data required to accommodate the different devices and platforms. With this underlying multidimensional layering structure, the SSE inherently sorts its overall generic data into discrete and overlapping sets specifically designed to accommodate a specific device and platform.

In addition to multidimensional layering of the SSE database, cross platform compatibility is also achieved with individual, platform unique, device specific drivers that each receive the generic raw SSE data and provide the necessary customization (e.g., formatting, filtering, projection, perspective, reveal) required to transform the raw SSE data into a data stream compatible with each individual user's device platform. In a specific embodiment, the individual device specific drivers are resident on the SSE database server. This embodiment has the advantages of higher security for some applications (e.g., games of chance) as well as less communications bandwidth utilization, with the disadvantage of higher processing requirements on the SSE database server. In a second specific embodiment, the individual device specific drivers are exclusively resident on each user's device. This embodiment has the advantages of less processing burden on the SSE database server and possibly less latency. In a third specific embodiment, the duties and consequently the residencies of the individual device specific drivers are divided between both the SSE database server and the user's devices. This embodiment has the advantages of reduced processing burden for the SSE database server, less latency, and higher security for some applications. Additionally, in another specific embodiment, the previously discussed first and third specific embodiments (where at least some portion of the device specific driver is resident on the SSE database server) can be configured where malicious user activity can be monitored and stopped with safeguards and constraints programmed into the device specific driver resident on the server that only allow a predetermined set of manipulations or alterations to the SSE database. In this embodiment the predefined authorized manipulations may vary from user to user. As added security, each server resident user device specific driver can be placed in its own "sandbox" (i.e., security mechanism for separating running the device drivers) such that malicious user attempts to bypass the device specific driver will result in termination of the malicious user's session.

As an inherent aspect of this general embodiment, type and configuration data is collected from the user's device each time he or she accesses the SSE database server. This data is used to customize and optimize the device specific driver created for the given user's device, with each device potentially receiving its own customized device specific driver. Thus the individual user device specific drivers are created and modified at the start of each session with some aspects of the device specific driver being compiled in a native machine format for its hosting device and other aspects of the device specific driver existing as an associated library of executable functions or data (e.g., Dynamic Link Library or "DLL") also resident on the hosting device.

Consequently, the same passive and active data collected from the user's device can also be utilized as an alternative form of user authentication via "fingerprinting" (e.g., user's Internet Protocol or "IP" address, type of device, configuration of device, Media Access Control or "Mac" address) of the user's device. In a specific embodiment, the device's fingerprint is compared to the user's device historical fingerprint whenever the user attempts to connect to the SSE database server, if the latest garnered fingerprint is substantially similar to the previous fingerprint, a lower level of authentication will suffice (e.g., username and password); however, if the user's device fingerprint has substantially changed (e.g., different Mac address, different type of device) a higher level of authentication (e.g., e-mail address, secret question) may be required before gaining access to the SSE database server.

In another specific embodiment, the user login data and sequential device fingerprints are maintained in a blockchain, such that an inalterable forensic data chain is maintained, documenting all user logins with associated devices. In a related specific embodiment, the blockchain can be expanded to include user actions when interacting with the SSE database and optionally the SSE database itself with Distributed Ledger Technology (DLT) thereby maintaining authentication, ownership of objects, environments, and programs created by different users in an inalterable forensic data chain.

Described are a number of mechanisms and methodologies that provide practical details for reliably establishing a collaborative VR and/or AR common virtual simulated environment for a plurality of users, wherein each user experiences the shared simulated environment from an individual perspective that is compatible with the user's chosen device and platform. Although the examples provided herein are primarily related to gaming environments, it is clear that the same methods are applicable to any form of collaborative virtual interaction—e.g., hospital biomed and neuroscience applications, teaching applications, maintenance applications.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
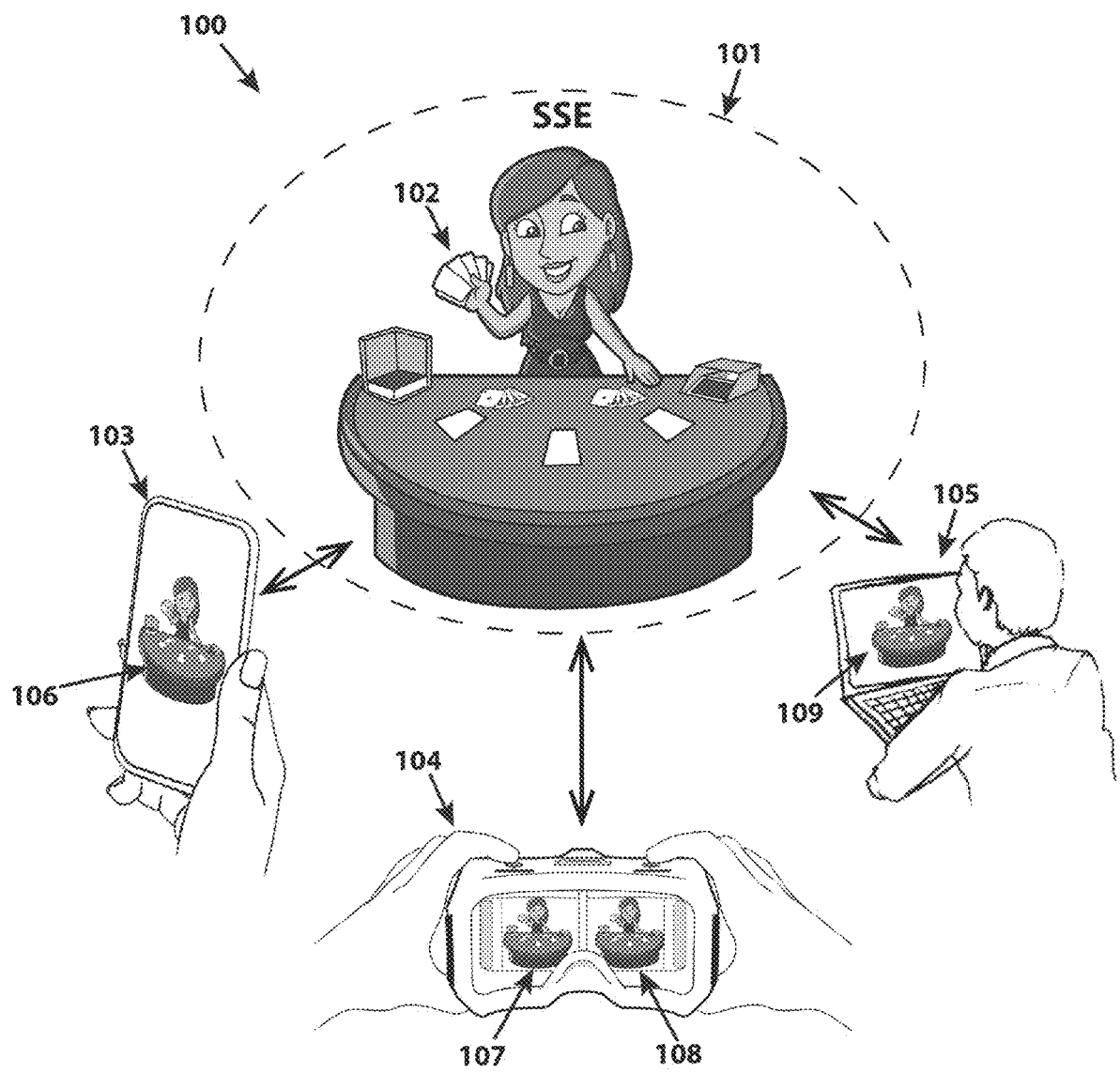
FIG. 1A is a representative example isometric view of the Superposition Simulated Environment (SSE) database interacting, via a virtual poker game, with a plurality of different platform user devices.

Certain terminology is used herein for convenience only and is not to be taken as a limitation on the present invention.

The words "a" and "an", as used in the claims and in the corresponding portions of the specification, mean "at least one." The abbreviations "AR" and "VR" denote "Augmented Reality" and "Virtual Reality" respectively. Augmented Reality (AR) is an interactive experience of a real-world environment whose elements are "augmented" by computer-generated perceptual information. While definitions of AR vary depending on the application, in the context of this invention AR denotes constructive (i.e. additive to the natural environment) overlaid visual and possibly audible sensory information seamlessly interwoven into images of the real world. Examples of existing AR platforms are: Apple iPhones®, Android® phones, Google Glass, Microsoft HoloLens, etc. AR augmented computer-generated perceptual information is referred to as "persistent digital objects", or "overlay images", or "visual digital image overlays" interchangeably throughout the specification and claims. Virtual Reality (VR) is an interactive computer-generated experience taking place completely within a simulated environment. VR as used in the claims and in the corresponding portions of the specification denotes complete immersion into the computer-generated experience with no real world environmental admitted and may also include audio. Examples of existing VR platforms are: Oculus, Windows Mixed Reality, Google Daydream, SteamVR headsets such as the HTC Vive & Vive Pro, etc.

In the context of the present invention, the term "Superposition Simulated Environment" or "SSE" is a common central database where all data required by each of the plurality of supported devices (e.g., VR, AR, two-dimensional computer or iPad screen) is stored and updated real time in the same non-volatile layered multidimensional database medium, such that models of common shared environments of persistent digital objects can be shared and manipulated by all supported devices. The term "superposition" is interpreted in the quantum physics sense of the word, wherein a quantum system exists in all possible states until an observation or measurement is made with the quantum superposition wave packet essentially collapsing into one tangible form of observed reality—e.g., Schrödinger's cat. Thus, the SSE database embodies all possible data for the common persistent digital object model shared by a plurality of different devices (e.g., VR, AR, two-dimensional computer or iPad screen). The aggregate data stored in the SSE database are sufficient to accommodate all supported devices, consequently the SSE database typically stores model data in excess of the data requirements of any one device (i.e., superposition state) with various subsets of SSE data transmitted to each device on an as needed basis (i.e., collapsed into discrete forms of reality).

A "wager" or "bet" are used interchangeably in the claims and in the corresponding portions of the specification means a gamble on predicting the outcome of a drawing (e.g., sporting event) in the future. Additionally, the terms "user," "player," or "consumer" are also used interchangeably all referring to a human individual utilizing the invention.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

In the exemplary system 100 general embodiment of FIG. 1A, a shared multidimensional SSE database 101 is conceptually shown being simultaneously accessed by an AR device 103, a VR device 104, and a Two-Dimensional (2D) laptop 105. Thus, as enabled by this invention, the shared SSE database 101 maintains the common aggregate persistent digital object model 102, which can be viewed and modified in varying subset formats native to the devices supported by the SSE database—e.g., format 103 native to AR device 106, formats 107 and 108 native to the VR device 104, and format 109 native to the 2D laptop 105. While the general embodiment 100 depicts a virtual poker game with three different players and associated different devices (103 thru 105), it should be understood that this is one simple exemplary system with pluralities of other variations possible—e.g., larger number of users, different device configurations, different games (e.g., craps, roulette, first person shooter). Furthermore, the benefits of this invention need not be limited to gaming environments, the same SSE system and methods disclosed herein are applicable to any form of collaborative virtual interaction e.g., hospital biomed and neuroscience applications, teaching applications, maintenance applications.

Figure 1B:
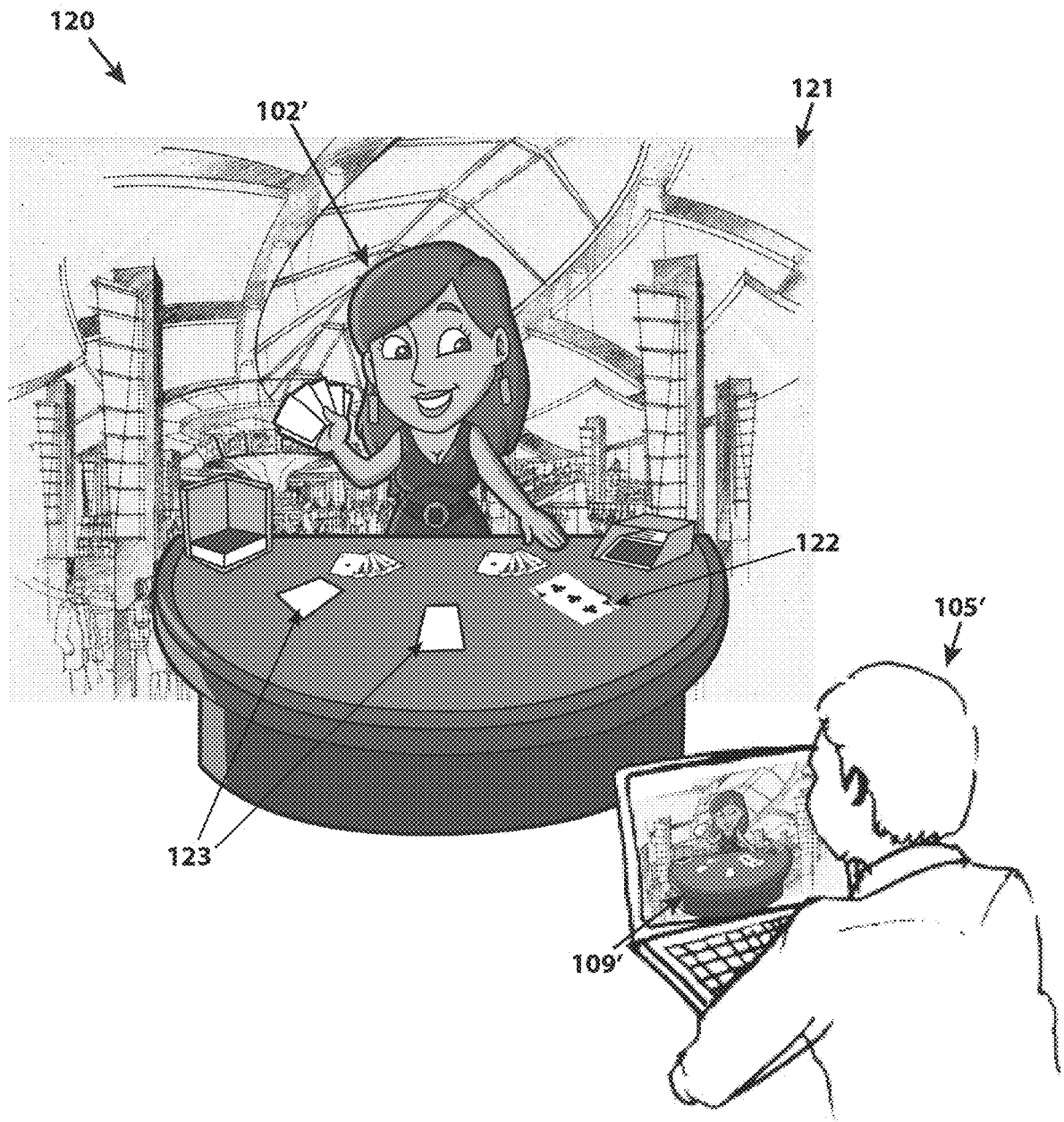
FIG. 1B is a representative example isometric view of the SSE database of FIG. 1A interacting, via a virtual poker game, with a user's Two-Dimensional (2D) computer screen and mouse.
Figure 1C:
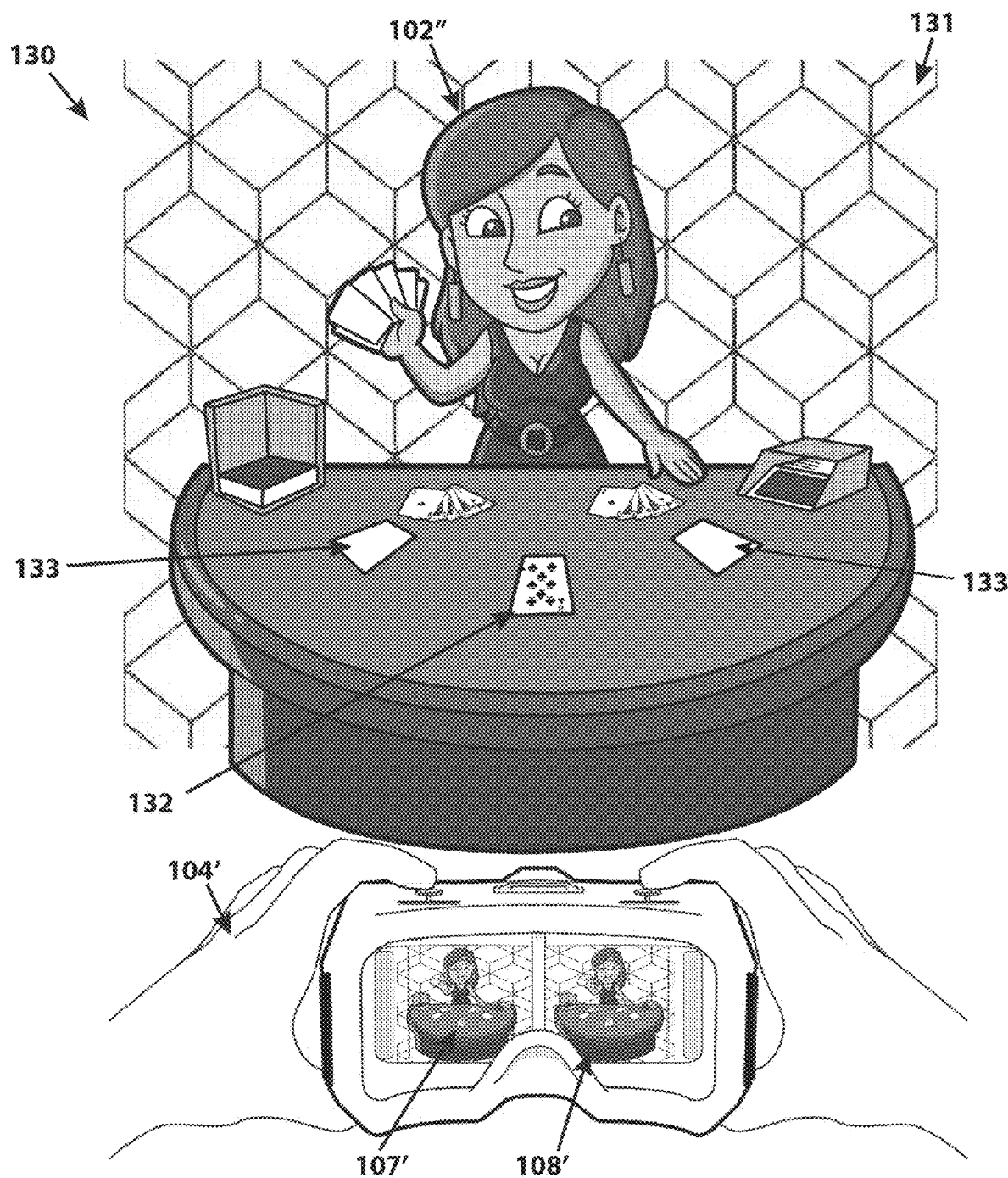
FIG. 1C is a representative example isometric view of the SSE database of FIG. 1A interacting, via a virtual poker game, with a user's VR device.
Figure 1D:
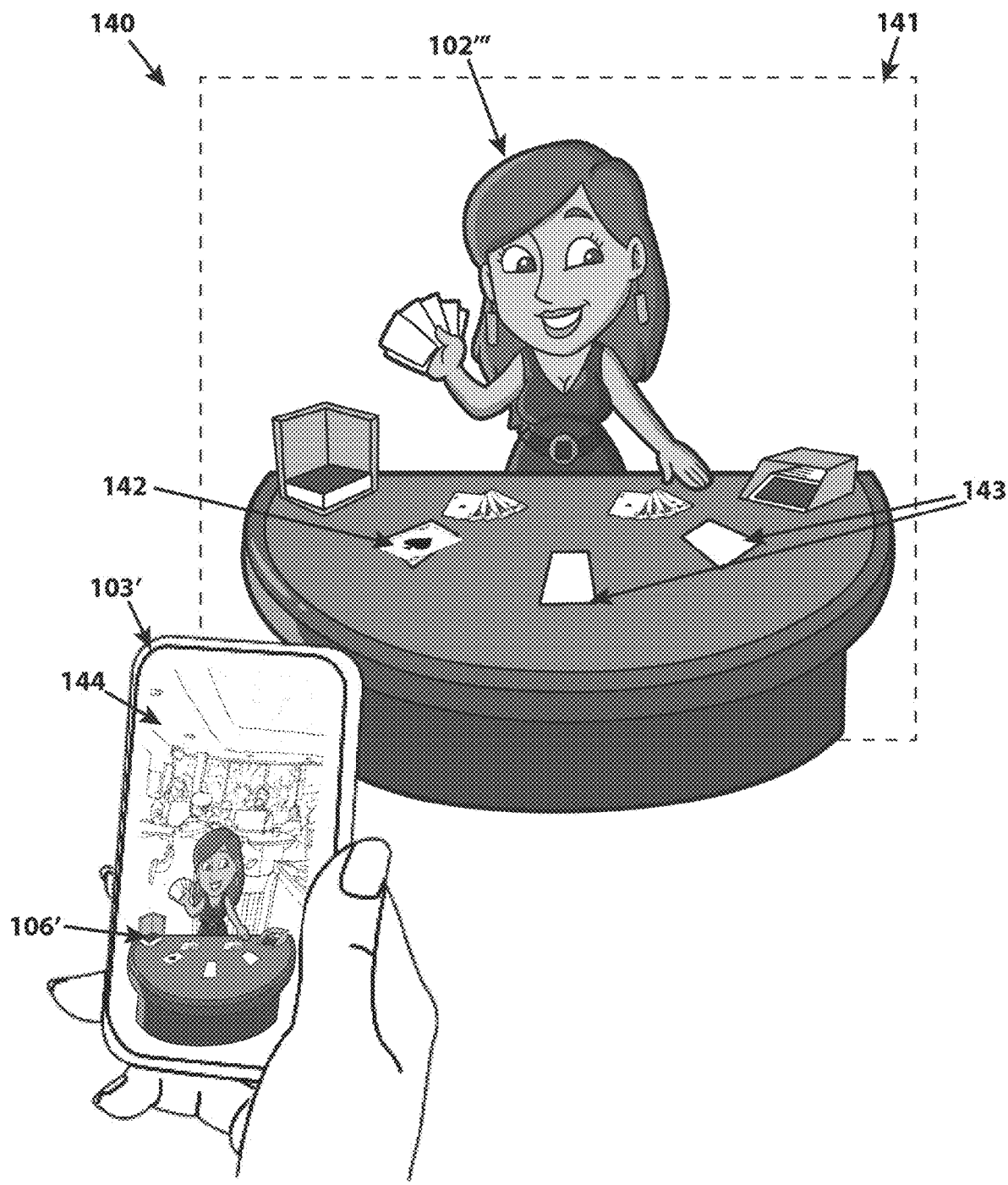
FIG. 1D is a representative example isometric view of the SSE database of FIG. 1A interacting, via a virtual poker game, with a user's AR device.

FIGS. 1B thru 1D taken together, provide detailed specific embodiments of the various different types of exemplary devices (103 thru 105 of FIG. 1A) interfacing to the SSE database's 101 common aggregate persistent digital object model 102 as depicted in the general embodiment 100. FIG. 1B illustrates the laptop 105' interfacing to the SSE database's common aggregate persistent digital object model 102', displaying the model 109' in a two-dimensional format from a given perspective. FIG. 1C illustrates the VR goggles 104' interfacing to the SSE database's common aggregate persistent digital object model 102", displaying the model in a simulated Three-Dimensional (3D) format 107' and 108' from a different perspective. Finally, FIG. 1D illustrates the SSE database's common aggregate persistent digital object model 102''' interfaced to an AR device 103' that receives 3D data such that portions can be displayed in a flattened format 106' superimposed over the real world background 144 captured by the AR device's camera with the flattened display changing depending on the AR device's perspective.

In the exemplary specific embodiment 120 of FIG. 1B, the subset of the SSE database's common aggregate persistent digital object model 102' is displayed on the laptop's 105' screen in a 2D format 109' native to the laptop's hardware and operating system. Since only a subset of the multilayered 3D aggregate data (maintained in the SSE database) is required to support the laptop's 105' native format, for bandwidth, security, and processing concerns it is preferable to selectively filter the SSE database model's 102' data prior to local processing by the laptop 105'. This selective filtering of the aggregate SSE database data is accomplished via an individual, platform unique, device specific driver specifically configured to deliver only the data necessary to display and (optionally) manipulate and/or modify the shared persistent digital object model 102' in a format native to the laptop 105'. This selective filtered model 102' data is used to customize and optimize the device specific driver created for the given user's device, with each device potentially receiving its own customized device specific driver. The manipulation and/or modification of the shared persistent digital object model 102' performs unique customization to transform portions of the SSE database data (also, referred to herein as "simulated environmental data") into a data stream that is compatible with each device type.

Whenever a user attempts to interact with the SSE database, their device is interrogated by the SSE database central site with the server collecting both passive and active data from the user's device to determine the operating parameters and configuration of the device. In an alternate preferred embodiment, this collected data can also be utilized as a secondary form of user authentication via "fingerprinting" (e.g., user's Internet Protocol or "IP" address, type of device, configuration of device, Media Access Control or "Mac" address, available fonts) of the user's device. Consequently, the individual user device specific drivers are created at the start of the initial session and modified (if necessary) each subsequent session with typically some portions of the device specific driver being compiled in a native machine format for its hosting device with other portions of the device specific driver typically embodied as an associated library of executable functions or data (e.g., Dynamic Link Library or "DLL"). As will be disclosed later, there are a plurality of embodiments with the physical location of each device's device specific driver varying (i.e., local to the SSE database server, local to the user's device, or portions of the device specific driver resident on both the SSE database server and user's device) from application to application. However, in all resident embodiments, the device's device specific driver provides the selective filtering and customization necessary for the user to interact with the SSE database's model.

Figure 1E:
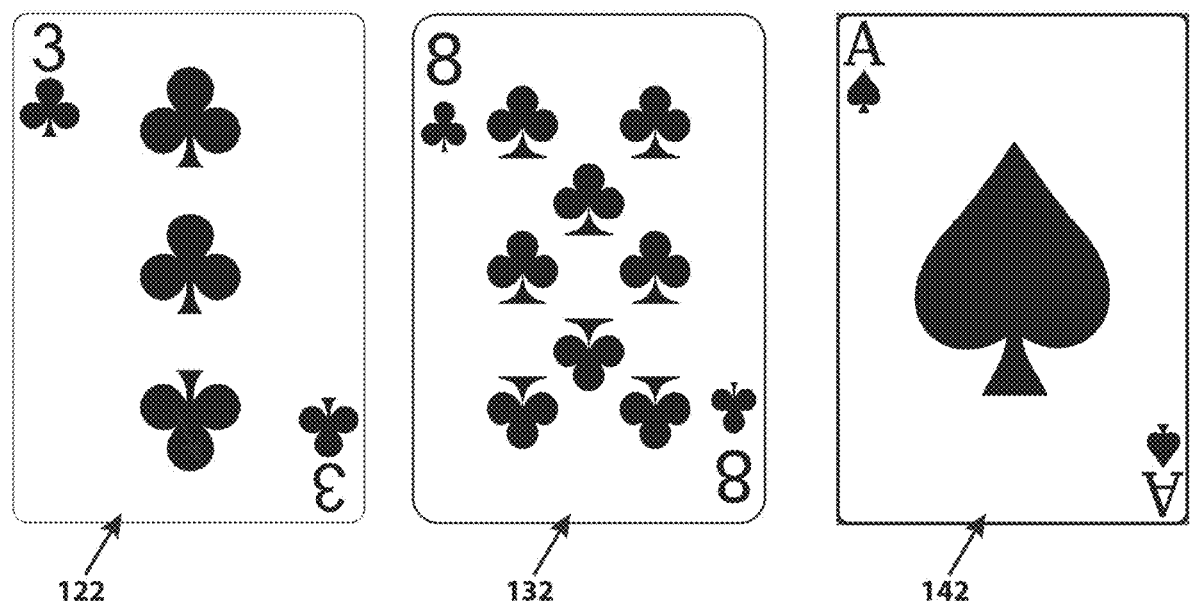
FIG. 1E is a magnified view of the representative example card draws of FIGS. 1B thru 1D.

As shown in FIG. 1B, the individual device specific driver also provides the necessary customization (e.g., formatting, filtering, projection, perspective, reveal) to meet the individual consumer's needs and/or requirements in addition to the physical device's native format. For example, as illustrated in specific embodiment 120, the consumer views the model 102' from the third position at the poker table 109' with a casino interior backdrop 121 that was custom selected by the consumer. Additionally, the consumer's one dealt card is visible to him 122 (a magnified view of the visible dealt card 122 is provided in FIG. 1E); however, he can only see the backs of the other two cards 123 (FIG. 1B) that have been dealt to the two other players. Thus, in the example of specific embodiment 120, the blocked portions of the SSE database filtering include security constrained portions (e.g., the not visible card faces 123 of the other two players) as well as perspective and extraneous data (e.g., 3D model data) not needed by the consumer's device 105'.

A different subset of the SSE database's common aggregate persistent digital object model 102" is delivered to a VR device 104' in embodiment 130 of FIG. 1C. In this VR embodiment 130, the multilayered 3D aggregate SSE database is required to support the VR device's native format thereby providing 3D data to support the left 107' and right 108' perspectives of the model 102". As before, selective filtering of the aggregate SSE database is accomplished via an individual, platform unique, device specific driver specifically configured to deliver only the data necessary to display and (optionally) manipulate and/or modify the shared persistent digital object model 102" in a format native to the VR device 104'. The individual user device specific driver being created at the start of the initial session and modified (if necessary) with each subsequent session. The manipulation and/or modification of the shared persistent digital object model 102" performs unique customization to transform portions of the SSE database data (also, referred to herein as "simulated environmental data") into a data stream that is compatible with each device type.

As shown in FIG. 1C, the individual device specific driver provides the necessary customization (e.g., formatting, filtering, projection, perspective, reveal) to meet the individual consumer's needs and/or requirements in addition to the physical device's native format. For example, as illustrated in specific embodiment 130, the VR consumer views the model 102" from the second position at the poker table 107' and 108' with a different casino interior backdrop 131 custom selected by the VR consumer. As before, the consumer's one dealt card is visible to him 132 (a magnified view of the visible dealt card 132 is provided in FIG. 1E) with only the backs of the other two cards 133 visible (FIG. 1C) that have been dealt to the two other players.

A third different subset of the SSE database's common aggregate persistent digital object model 102''' is delivered to an AR device 103' in embodiment 140 of FIG. 1D. In this AR embodiment 140, the multilayered 3D aggregate SSE database is required to support the AR device's native format providing "flattened" 3D data (i.e., 3D data displayed on one 2D screen) with the backdrop 141 rendered transparent. Again, selective filtering of the aggregate SSE database is accomplished via an individual, platform unique, device specific driver specifically configured to deliver only the data necessary to display and (optionally) manipulate and/or modify the shared persistent digital object model 102''' in a format native to the AR device 103'. The individual user device specific driver being created at the start of the initial session and modified (if necessary) with each subsequent session. The manipulation and/or modification of the shared persistent digital object model 102''' performs unique customization to transform portions of the SSE database data (also, referred to herein as "simulated environmental data") into a data stream that is compatible with each device type.

FIG. 1D illustrates the individual device specific driver provides the necessary customization (e.g., formatting, filtering, projection, perspective, reveal) to meet the individual consumer's needs and/or requirements in addition to the physical device's native format. For example, as illustrated in specific embodiment 140, the AR consumer views the model 102''' from the first position at the poker table 107' and 108' with the real world consumer's environment (as captured by the AR device's internal camera) displayed 144 as the backdrop. Similar to before, the consumer's one dealt card is visible to her 142 (a magnified view of the visible dealt card 142 is provided in FIG. 1E) with only the backs of the other two cards 143 visible (FIG. 1D) that have been dealt to the two other players.

Figure 2:
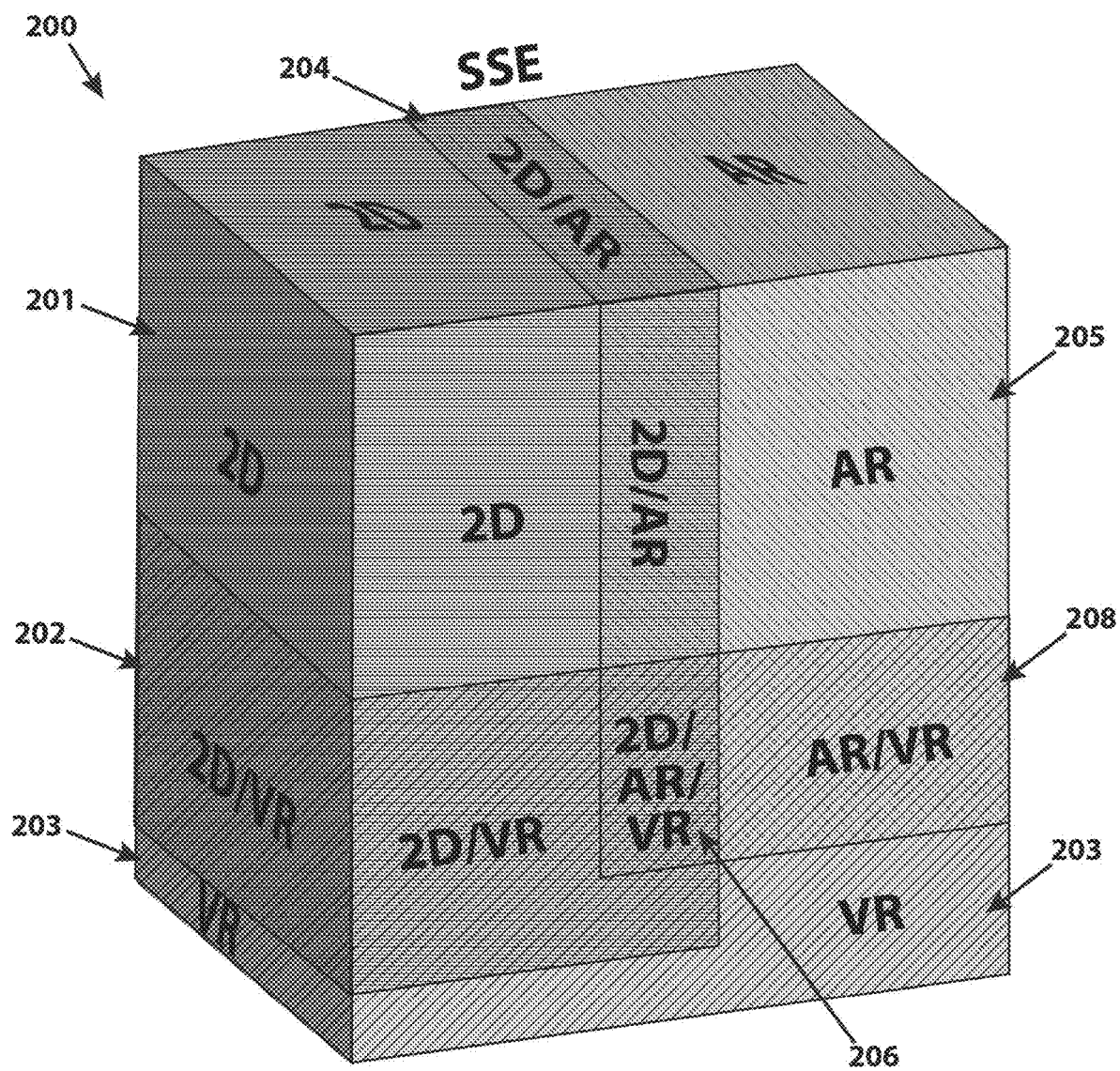
FIG. 2 is a three-dimensional conceptual illustration of the multidimensional layering of the superposition simulated environment enabling data filtering for a: 2D computer screen and mouse, a VR device, and an AR device.

A three-dimensional conceptual illustration highlighting the multidimensional layering of the SSE database, that is also compatible with the shared general embodiment 100 of FIG. 1A, is provided in FIG. 2. As shown in FIG. 2, the shared multidimensional SSE database 200 illustrates three separate layers for data storage necessary to support: a 2D device 201 (e.g., laptop 105 of FIG. 1A), a VR device 203 (e.g., VR goggles 104 of FIG. 1A), and an AR device 205 (e.g., AR smart phone 103 of FIG. 1A). Thus, the FIG. 2 conceptual illustration 200 allocates separate layers or areas in its multidimensional database configuration for each of the supported devices (i.e., 2D device 201, VR device 203, and AR device 205) thereby facilitating faster data access as well as enhanced data security and integrity. Preferably, these separate areas maintain portions of the SSE model data in formats native to the targeted device.

When a device logs onto the SSE database, the portions of the database pertinent to the device can be immediately loaded into high-speed volatile memory, preferably in its own "sandbox" (i.e., a restricted environment where each user has at most temporary access to a restricted directory), thereby greatly enhancing speed. With this configuration, any user modifications to the SSE database would typically be copied from the high speed volatile memory to the lower speed nonvolatile memory before any acknowledgement is sent back to the user's device that initiated the change. This segmented (e.g., layered, sandbox) data storage also functions as a level of protection for the integrity of the SSE model data itself with read and write access to a given segment being restricted to only authorized devices. This is not to imply that only one device type can access each segment of data memory. As shown in FIG. 2, there are pluralities of SSE database segments that intersect and overlap (e.g., 2D and AR "2D/AR" segment 204, 2D and VR "2D/VR" 202, AR and VR "AR/VR" segment 206, 2D, AR, and VR "2D/AR/VR" segment 206) where SSE model data embodied in these intersecting and overlapping segments is accessible by more than one device type. Preferably, the data embodied in these intersecting and overlapping segments is saved in a universal format that can be readily read and written by each type of device's specific driver.

In an alternative embodiment, the entire SSE database 200 of FIG. 2 or portions thereof can be hosted as a part of a larger distributed ledger or blockchain. This alternative embodiment has the advantage of logging all or some SSE database modifications in an inalterable forensic data chain with the inherent enhanced security benefits gained from this implementation with the disadvantages of greater complexity and processing power requirements for the SSE database server.

Figure 3A:
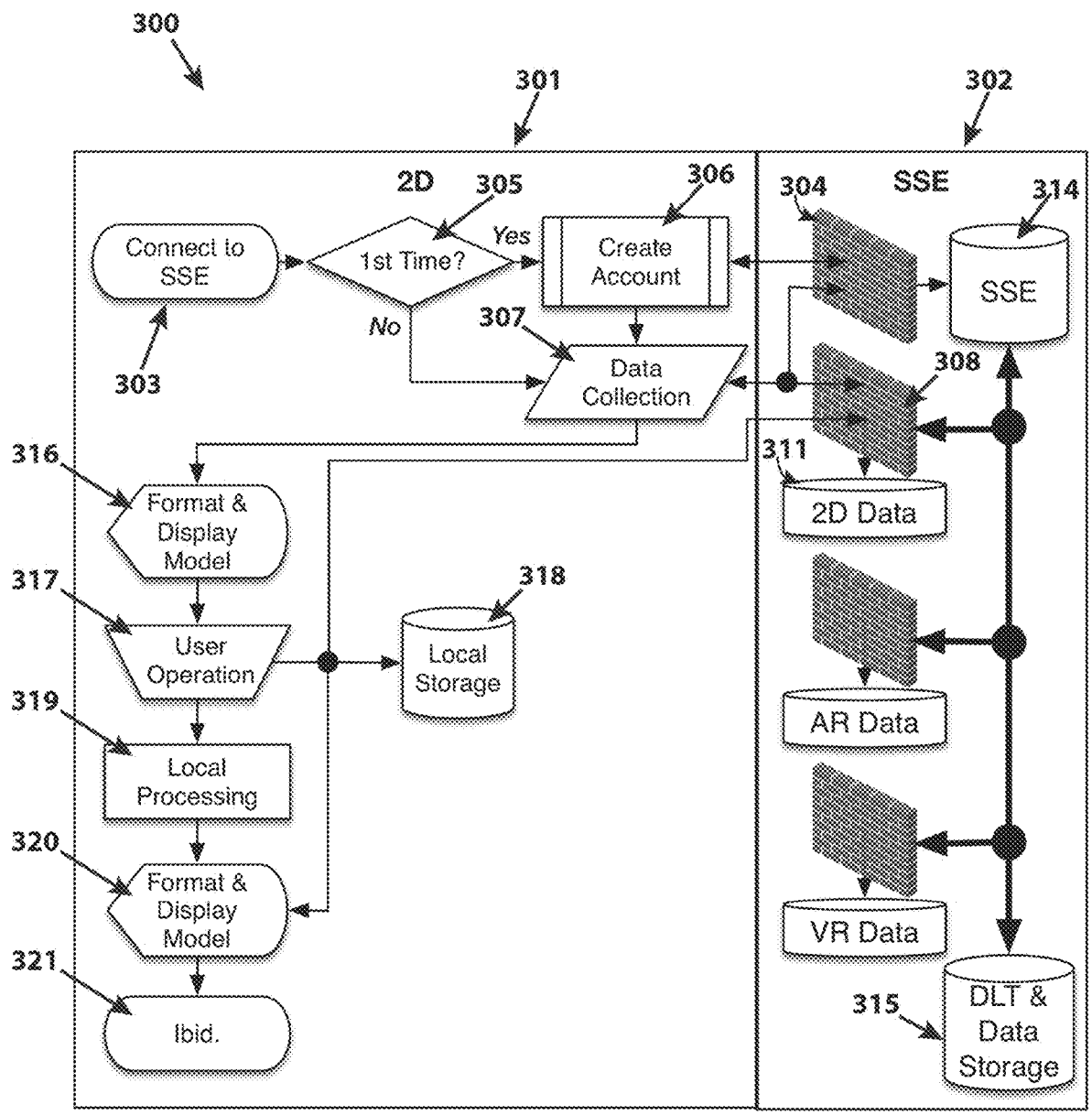
FIG. 3A is an overall swim lane flowchart representative example of the processes associated with operating and maintaining a superposition simulated environment database compatible with the specific embodiment of FIG. 1B (2D device interfacing to SSE) where the device specific driver is exclusively resident on the SSE database's server.
Figure 3B:
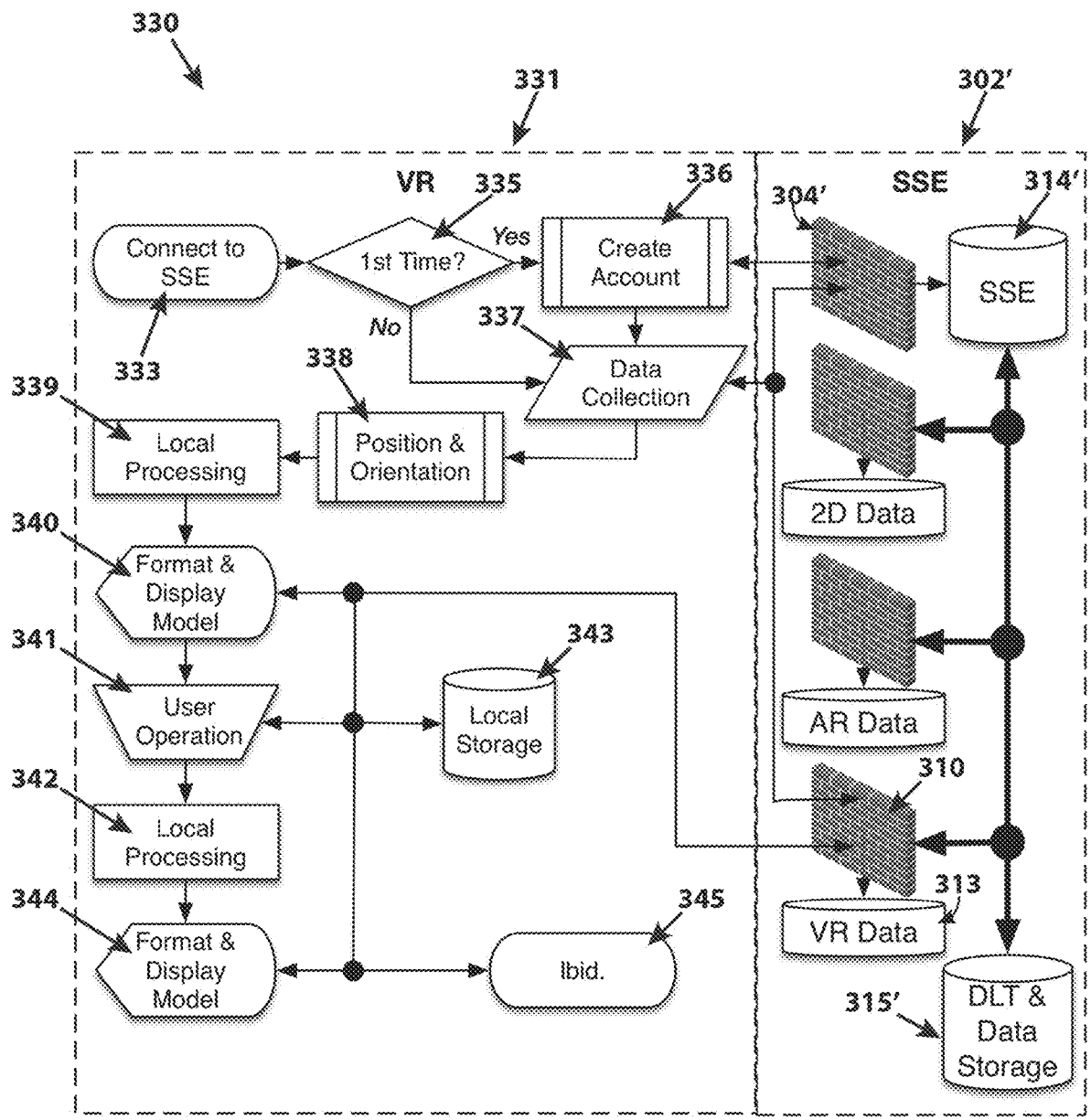
FIG. 3B is an overall swim lane flowchart representative example of the processes associated with operating and maintaining a superposition simulated environment database compatible with the specific embodiment of FIG. 1C (VR device interfacing to SSE) where the device specific driver is exclusively resident on the SSE database's server.
Figure 3C:
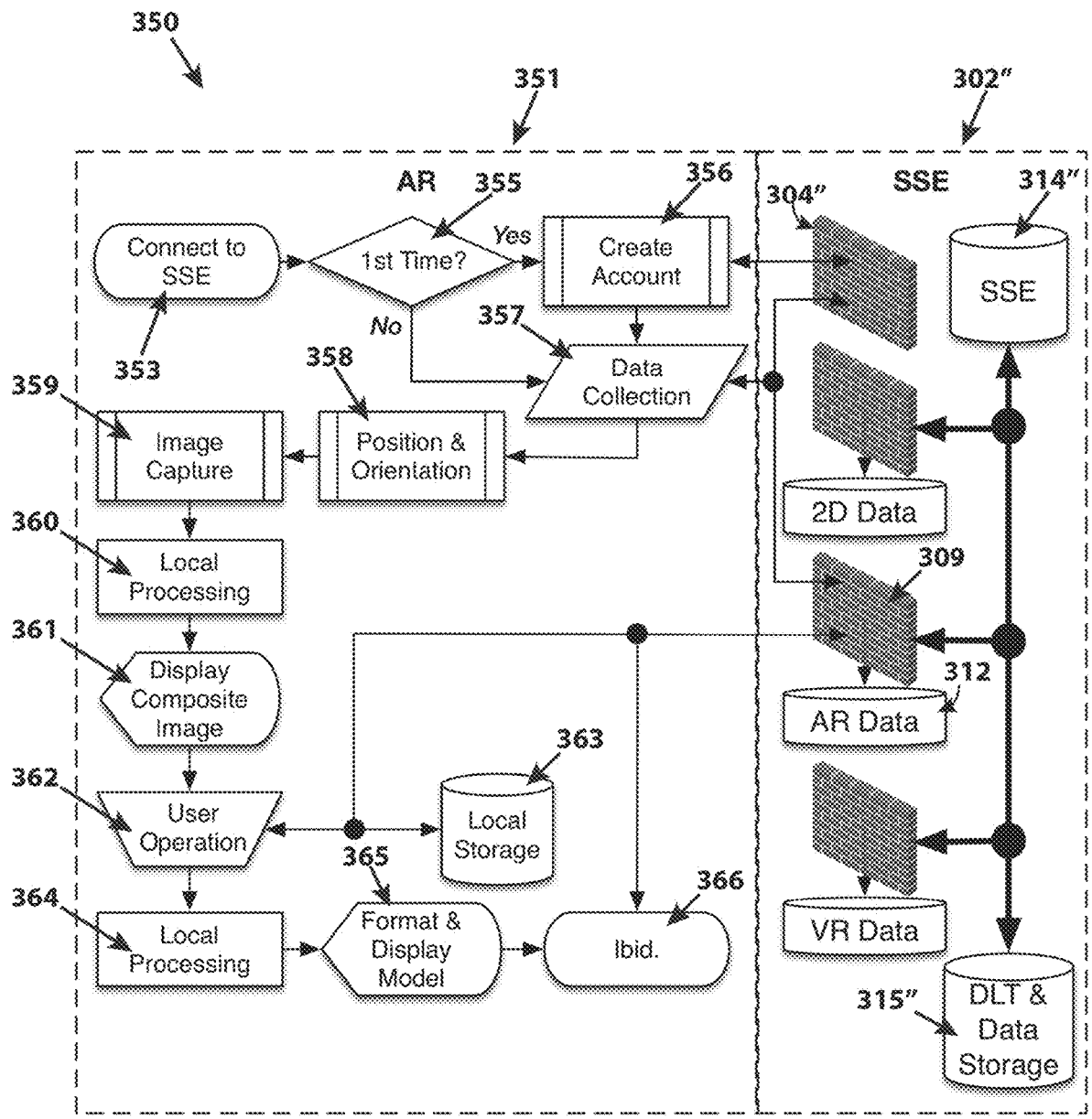
FIG. 3C is an overall swim lane flowchart representative example of the processes associated with operating and maintaining a superposition simulated environment database compatible with the specific embodiment of FIG. 1D (AR device interfacing to SSE) where the device specific driver is exclusively resident on the SSE database's server.

FIGS. 3A thru 3C, taken together, illustrate the embodiment of the exemplary SSE database of FIG. 1A with various device specific drivers resident on the SSE server. As shown in the exemplary illustrations of FIGS. 3A thru 3C, in this specific embodiment the SSE server is accessed by three different types of user devices (one type of user device per figure), specifically: a 2D device 301 in 300 of FIG. 3A, a VR device 331 in 330 of FIG. 3B, and an AR device 351 in 350 of FIG. 3C. All three of the FIGS. 3A thru 3C swim lane flowcharts 300, 330, and 350 are conceptually divided into two groups (i.e., device and "SSE") by the two "swim lane" columns. If a particular flowchart function appears completely within a swim lane, its functionality is limited to the data category of the associated swim lane—e.g., "Local Storage" 318, 343, and 363 are exclusively maintained by the 2D (FIG. 3A), VR (FIG. 3B), and AR (FIG. 3C) devices respectively.

The FIG. 3A swim lane flowchart 300 begins with the user's 2D device 301 initiating a connection 303 with the SSE server 302. The first time 305 the user's device 301 initiates a connection with the SSE server 302 a user account must first be created 306, uniquely authenticating both the human user's identity and the user's device 301. At this time, the SSE server 302 automatically interrogates the user's device 301 via a generic interface 304 that preferably also functions as a firewall to the SSE database 314. Both passive and active interrogated data 307 collected from the user's device 301 are saved 311 (and optionally 315), thereby logging the user's device 301 type, operating parameters, configuration, etc. This interrogated data 307 is utilized by the server 302 to generate the unique device specific driver 308 for the user's device 301 that is preferably compiled to run on the SSE server 302 in a native format. In addition to the compiled portion, the device specific driver 308 typically also includes libraries of executable functions or data (e.g., DLL). The created device specific driver 308 functioning to filter the SSE database model data 314 to only provide the appropriate data required for the user's 2D device 301 to operate as well as to act as a virtual "firewall" 308 to isolate and protect the SSE database 314 from both malicious and/or unintended unauthorized data manipulation by the user's device 301.

In addition to possibly filtering non-device applicable data (e.g., 3D data filtered from the 2D device of 300), the device specific driver may preferably also filter security related data, thereby ensuring confidential or sensitive data is only transmitted from the SSE database 314 to the appropriate authorized device—e.g., the face up card 122 illustrated in the example of FIG. 1B would only be transmitted to the 2D device 105' authorized to view the card 122 with the other two cards 123 face up data blocked by device specific driver 308 (FIG. 3A).

The firewall portion of the device specific driver's 308 functionality not only authenticates the individual user but also the user's device 301 (i.e., comparing a received fingerprint to previously logged data). Additionally, the device specific driver's 308 firewall functionality may also include a "stateful inspection" feature that checks each session to ensure that all communications are within a predefined set of commands and that no out-of-specification transmissions from the user's device 301 have been attempted.

Subsequent times 305 the user's device 301 initiates a connection with the SSE server 302, the SSE server 302 collects 311 both passive and active data from the user's device 307 comparing the received data to the previous device fingerprint stored in memory (311 and optionally 315) to determine if it has significantly changed from the previous session. If no substantial changes have occurred and the user is properly authenticated, a session will be established via the user's device unique device specific driver 308. Alternatively, if substantial changes in the user's device 301 are noted, a security event may be triggered resulting in possible reduced accessibility and/or another level of authentication. Additionally, significant changes in the user's device 307 fingerprint may result in the device specific driver 308 being reconfigured, restructured, or recompiled by the SSE server 302 to accommodate the user's device changes prior to the session commencing.

In a specific embodiment, the user login data and sequential device fingerprints are maintained in a blockchain 315, such that an inalterable forensic data chain is maintained, documenting all user logins with associated devices via Distributed Ledger Technology ("DLT"). This blockchain can be expanded to include user actions when interacting with the SSE database as well as DLT authentication data thereby enabling the concept of ownership of objects, environments, and programs created by different users. In an alternative specific embodiment, the entire SSE database or portions thereof are also maintained in blockchain 315, such that an inalterable forensic data chain documenting all or some SSE database changes are also maintained in DLT log.

After the device specific driver 308 is verified and/or modified and the session is initiated, portions of the SSE database model data 314 are transmitted to the user's device 301, preferably in a format native to the user's device 301, with some shared model portions possibly transmitted in an universal SSE database format. The user device 301 native formatted data being preferably stored in the user's device exclusive layer (e.g., 201 of FIG. 2) of the SSE database with the universal SSE database format data being stored in the shared or intersecting layers (e.g., 202, 204, and 206 of FIG. 2) of the SSE database.

Returning to the swim lane flowchart 300 of FIG. 3A, the SSE database model data is received by the user's device 301 where the 2D data is formatted for the screen and displayed 316 (see 109' of FIG. 1B). At this point, the user may interact with the displayed model 317 (FIG. 3A) with any of the predefined commands enabled by the device specific driver 308 with some commands executed and stored locally 318 on the user's device 301 in a native application. The SSE database model 314 then responds to the user's commands 317, downloading new model data for local processing 319 on the user's device 301 resulting in a modified model display 320. This process is continued 321 until the user terminates the active session.

The FIG. 3B exemplary swim lane flowchart 330 is similar to the exemplary flowchart 300 of FIG. 3A with the FIG. 3B example employing a VR user device 331 with its unique device specific driver 310 also resident on the SSE server 302'. As before, flowchart 330 begins with the VR device 331 attempting to connect 333 to the SSE server 302'.

The first time 335 the user's device 331 initiates a connection with the SSE server 302', a user unique account will be created 336, uniquely authenticating both the human user's identity and the user's device 331. At this time, the SSE server 302' automatically interrogates the user's device 331 via a generic interface 304' that preferably also functions as a firewall to the SSE database 314'. Both passive and active interrogated data 337 collected from the user's device 331 are saved 313 (and optionally 315'), thereby logging the user's device 331 type, operating parameters, configuration, etc. This interrogated data 337 is then utilized by the server 302' to generate the unique device specific driver 310 for the user's device 331 that is preferably compiled to run on the SSE server 302' in a native format. In addition to the compiled portion, the device specific driver 310 also includes libraries of executable functions or data.

Subsequent times 335 the user's device 331 initiates a connection with the SSE server 302', the SSE server 302' collects 337 both passive and active data comparing the received data to the previous device fingerprint stored in memory (313 and optionally 315') to determine if the new fingerprint has significantly changed from the previous session. If no substantial changes have occurred and the user is properly authenticated, a session will be established via the user's device unique device specific driver 310. Alternatively, if substantial changes in the user's device 331 are noted, a security event may be triggered resulting in possible reduced accessibility and/or another level of authentication. Additionally or alternatively, the device specific driver 310 may be automatically reconfigured, restructured, or recompiled by the SSE server 302' to accommodate the user's device 331 changes prior to the session commencing. As before, in a specific alternative embodiment, the user login data, sequential device fingerprints, and optionally user actions are maintained in a blockchain 315', such that an inalterable forensic data chain is maintained. In an alternative specific embodiment, the entire SSE database or portions thereof are also maintained in blockchain 315', such that an inalterable forensic data chain documenting all or some SSE database changes are also maintained in DLT log.

After the device specific driver 310 is verified and/or modified and the session is initiated, portions of the SSE database model data 314' are transmitted to the user's device 331, preferably in a format native to the user's device 331, with some shared or intersecting model portions preferably transmitted in an universal SSE database format. The user device 331 native formatted data being preferably stored in a user device exclusive layer (e.g., 203 of FIG. 2) of the SSE database 200 with the universal SSE database format data being stored in the shared or intersecting layers (e.g., 202, 206, and 208 of FIG. 2) of the SSE database 200 of FIG. 2.

Returning to FIG. 3B, the SSE database model data is received 337 by the user's device 331 where the VR data is rendered by local processing 339 in 3D (i.e., different images for the left and right eye—e.g., see 107' and 108' of FIG. 1C) with regard to the position and orientation 338 (FIG. 3B) of the VR device resulting in rendered images formatted for the screen and displayed 340. At this point, the user may interact with the displayed model 341 with any of the predefined commands enabled by the device specific driver 310 with some commands executed and stored locally 343 on the user's device 331 in a native application. The SSE database model 314' then responds to the user's commands, downloading new model data for local processing 342 on the user's device 331 resulting in a modified model display 344. This process is continued 345 until the user terminates the active session.

Finally, the FIG. 3C swim lane flowchart 350 depicts the same general exemplary SSE database model of FIG. 1A with the FIG. 3C example allowing access to a user's AR device 351. Flowchart 350 begins with the AR device 351 attempting to connect 353 to the SSE server 302".

The first time 355 the user's device 351 initiates a connection with the SSE server 302", a user unique account will be created 356, uniquely authenticating both the human user's identity and the user's device 351. At this time, the SSE server 302" automatically interrogates the user's device 351 via a generic interface 304" that preferably also functions as a firewall to the SSE database 314". Both passive and active interrogated data 357 collected from the user's device 351 are saved 312 (and optionally 315"), thereby logging the user's device 351 type, operating parameters, configuration, etc. This interrogated data 357 is then utilized by the server 302" to generate the unique device specific driver 309 for the user's device 351 that is preferably compiled to run on the SSE server 302" in a native format. In addition to the compiled portion, the device specific driver 309 also includes libraries of executable functions or data.

Subsequent times 355 the user's device 351 initiates a connection with the SSE server 302", the SSE server 302" collects 357 both passive and active data comparing the received data to the previous device fingerprint stored in memory (312 and optionally 315") to determine if the new fingerprint has significantly changed from the previous session. If no substantial changes have occurred and the user is properly authenticated, a session will be established via the user's device unique device specific driver 309. Alternatively, if substantial changes in the user's device 351 are noted, a security event may be triggered resulting in possible reduced accessibility and/or another level of authentication. Additionally or alternatively, the device specific driver 309 may be automatically reconfigured, restructured, or recompiled by the SSE server 302" to accommodate the user's device 351 changes prior to the session commencing. As before, in a specific alternative embodiment, the user login data, sequential device fingerprints, and optionally user actions are maintained in a blockchain 315", such that an inalterable forensic data chain is maintained. In an alternative specific embodiment, the entire SSE database or portions thereof are also maintained in blockchain 315", such that an inalterable forensic data chain documenting all or some SSE database changes are also maintained in DLT log.

After the device specific driver 309 is verified and/or modified and the session is initiated, portions of the SSE database model data 314" are transmitted to the user's device 351 preferably in a format native to the user's device 351 with some shared or intersecting model portions transmitted in an universal SSE database format. The user device 351 native formatted data being preferably stored in the device exclusive layer (e.g., 205 of FIG. 2) of the SSE database 200 with the universal SSE database format data being stored in the shared or intersecting layers (e.g., 204, 206, and 208) of the SSE database 200 of FIG. 2.

Returning to FIG. 3C, the SSE database model data is received 357 by the user's device 331 where the 3D AR data is rendered by local processing 360 flattened to the current perspective (i.e., the full 3D model is downloaded to the AR device with the model flattened or sliced to create a 2D rendering from the point of view of the AR device—see 106' of FIG. 1D) with regard to the position and orientation 358 (FIG. 3C) of the AR device. The rendered image is formatted for the AR screen and displayed 361 as a layer on top of the real world image captured 359 by the AR device's camera (e.g., 144 of FIG. 1D). At this point, the user may interact with the displayed model 362 (FIG. 3C) with any of the predefined commands enabled by the device specific driver 309 with some commands executed and stored locally 363 on the user's device 351 in a native application. The SSE database model 314" then responds to the user's commands, downloading new model data for local processing 364 on the user's device 351 resulting in a modified model display 365. This process is continued 366 until the user terminates the active session.

Thus, in the embodiments of FIGS. 3A thru 3C, pluralities of different types of devices (e.g., 2D 301 of FIG. 3A, VR 331 of FIG. 3B, and AR 351 of FIG. 3C) communicate and manipulate the same common SSE database model in a harmonious manner via pluralities of unique custom device specific drivers resident on the SSE database server. This embodiment has the advantages of higher security for some applications (e.g., games of chance) as well as less communications bandwidth utilization, with the disadvantage of higher processing requirements on the SSE database server.

Figure 4A:
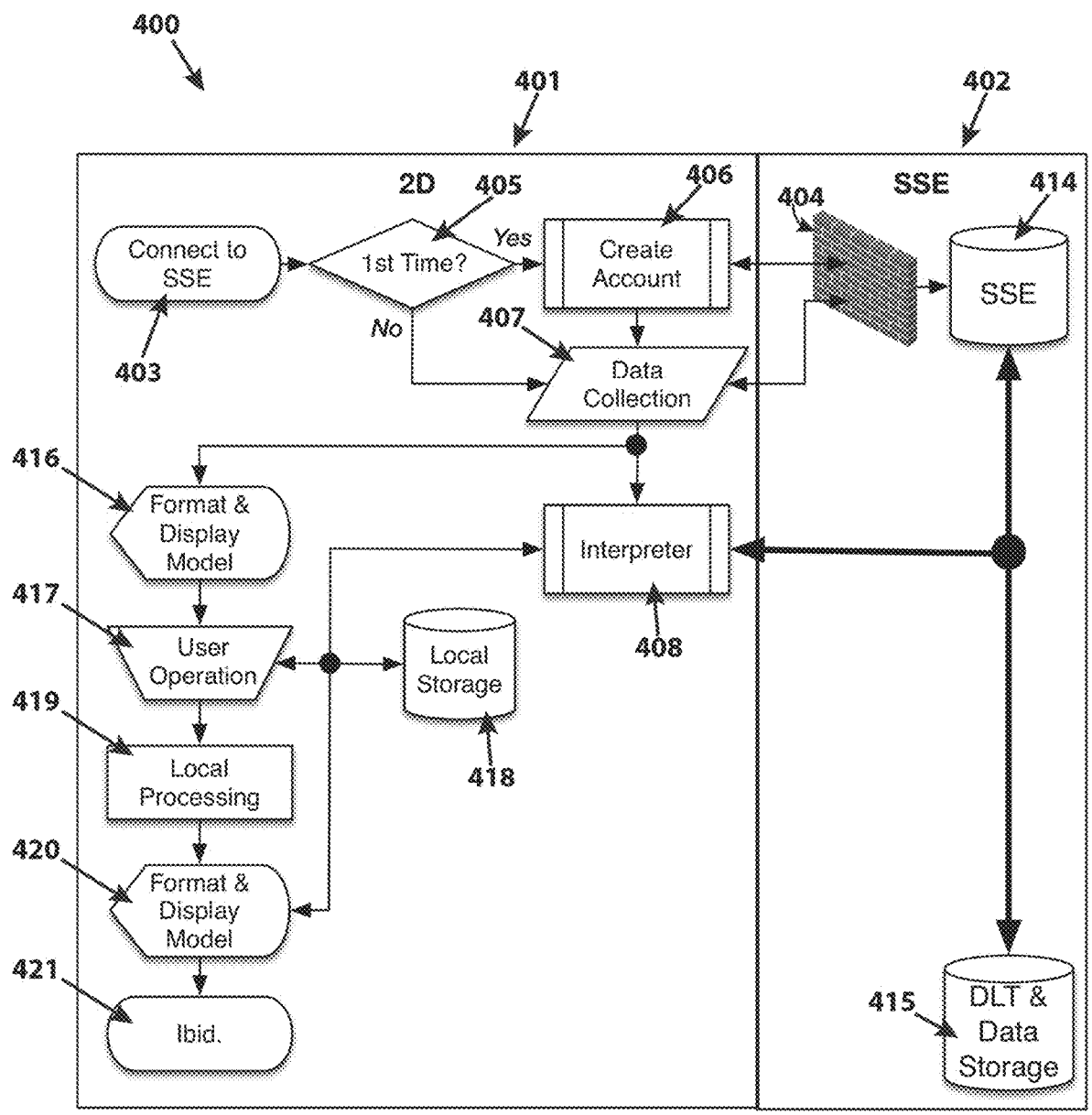
FIG. 4A is an overall swim lane flowchart representative example of the processes associated with operating and maintaining a superposition simulated environment database compatible with the specific embodiment of FIG. 1B (2D device interfacing to SSE) where the device specific driver is exclusively resident on the user's device.
Figure 4B:
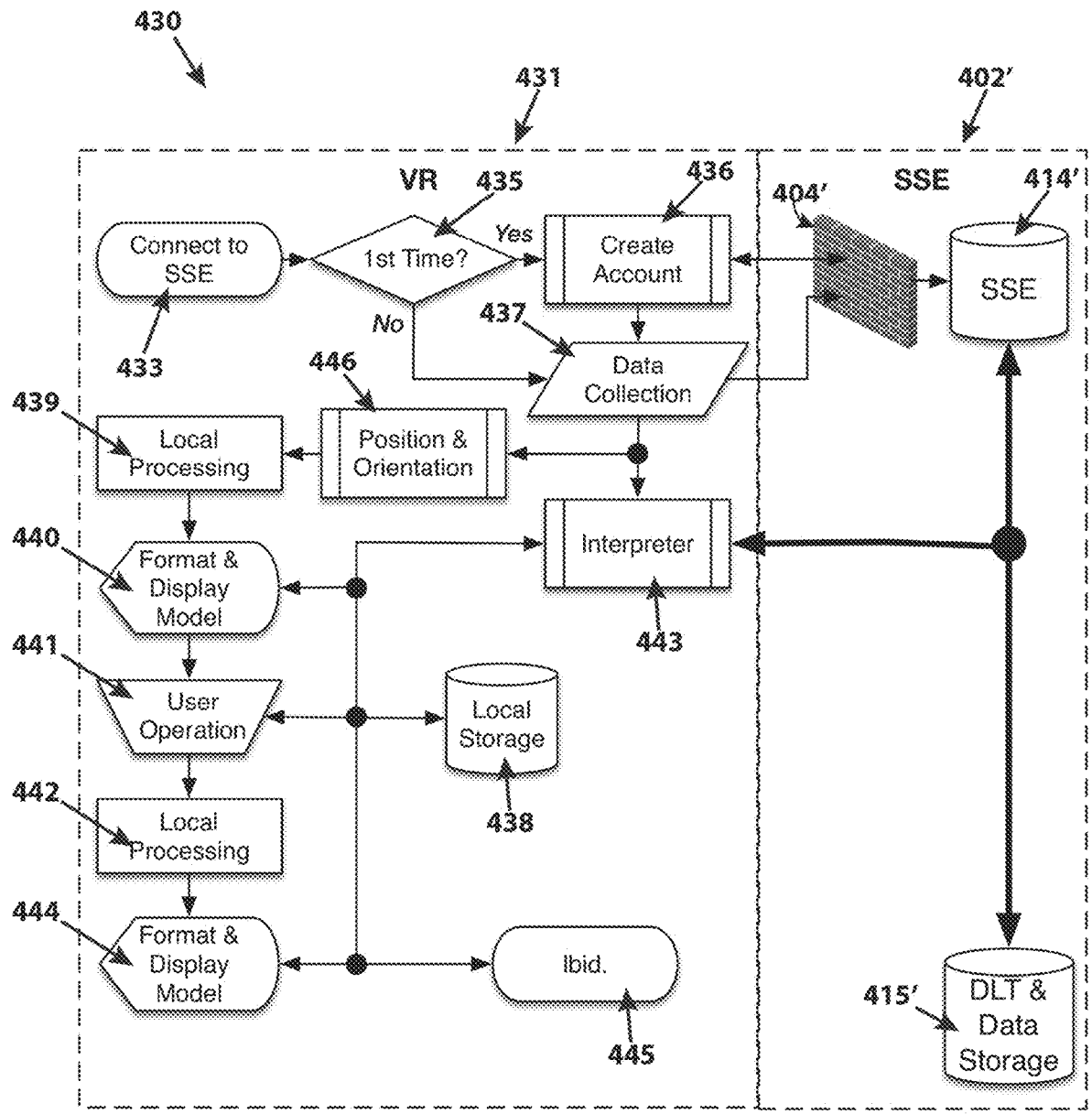
FIG. 4B is an overall swim lane flowchart representative example of the processes associated with operating and maintaining a superposition simulated environment database compatible with the specific embodiment of FIG. 1C (VR device interfacing to SSE) where the device specific driver is exclusively resident on the user's device.
Figure 4C:
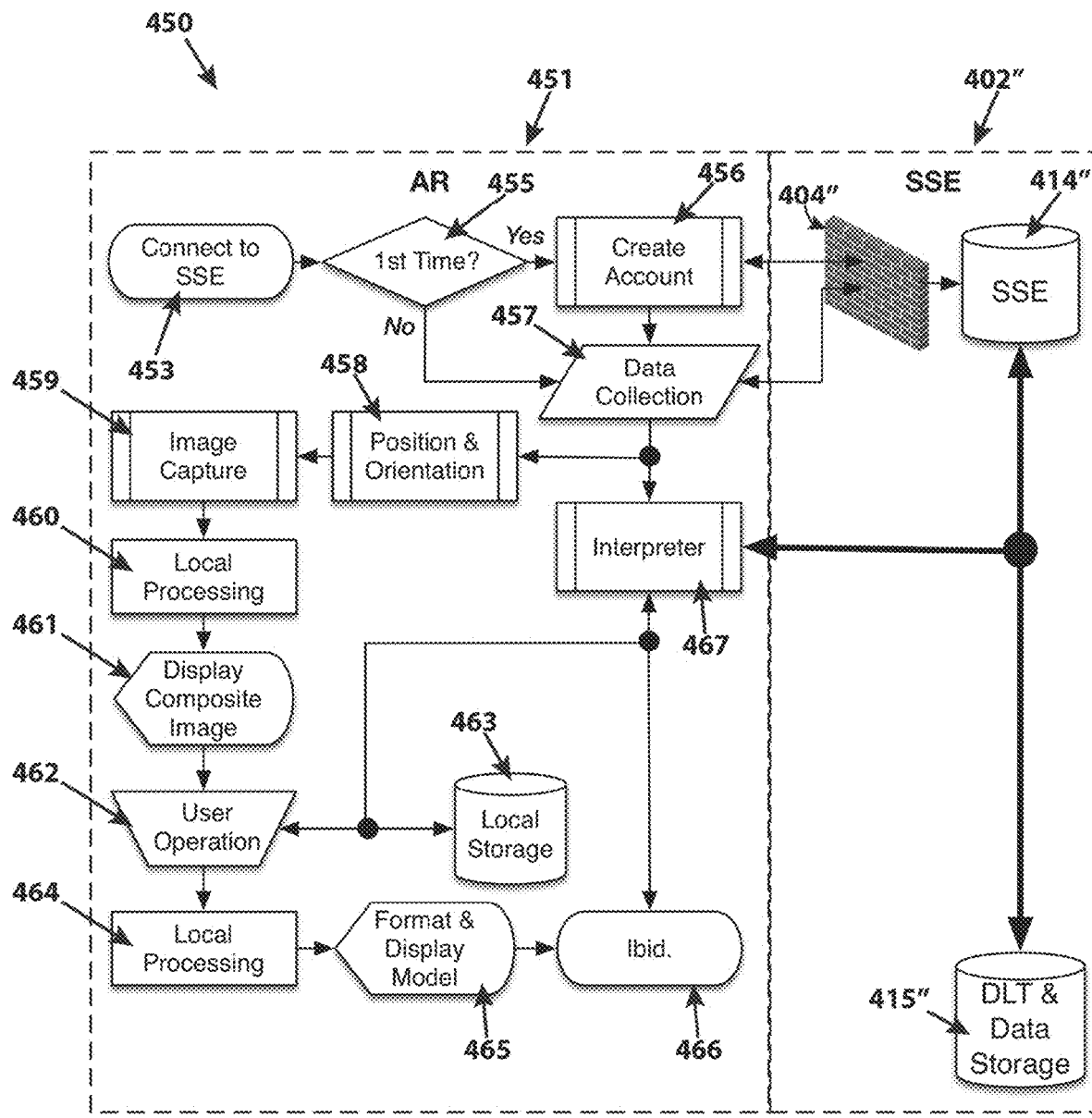
FIG. 4C is an overall swim lane flowchart representative example of the processes associated with operating and maintaining a superposition simulated environment database compatible with the specific embodiment of FIG. 1D (AR device interfacing to SSE) where the device specific driver is exclusively resident on the user's device.

FIGS. 4A thru 4C, taken together, illustrate the embodiment of the exemplary SSE database of FIG. 1A with various device specific drivers resident on the device itself. As shown in the exemplary illustrations of FIGS. 4A thru 4C, in this specific embodiment the SSE server is accessed by three different types of user devices specifically: a 2D device 401 in 400 of FIG. 4A, a VR device 431 in 430 of FIG. 4B, and an AR device 451 in 450 of FIG. 4C. All three of the FIGS. 4A thru 4C swim lane flowcharts 400, 430, and 450 are conceptually divided into two groups (i.e., device and "SSE") by the two "swim lane" columns. If a particular flowchart function appears completely within a swim lane, its functionality is limited to the data category of the associated swim lane—e.g., "Local Storage" 418, 443, and 463 are exclusively maintained by the 2D (FIG. 4A), VR (FIG. 4B), and AR (FIG. 4C) devices respectively.

The FIG. 4A swim lane flowchart 400 begins with the user's 2D device 401 initiating a connection 403 with the SSE server 402. The first time 405 the user's device 401 initiates a connection with the SSE server 402 a user account will be created 406, uniquely authenticating both the human user's identity and the user's device 401. At this time, the SSE server 402 automatically interrogates the user's device 401 via a generic interface 404 that preferably also functions as a firewall to the SSE database 414. This interrogated data 407 is utilized by the server 402 to generate the unique device specific driver 408 for the user's device 401 that is preferably compiled to run on the user's device 401 in a native format. In addition to the compiled portion, the device specific driver 408 typically also includes libraries of executable functions or data. The created device specific driver 408 functioning to filter the SSE database model data 414 to only provide the appropriate data required for the user's 2D device 401 to operate as well as to isolate and protect the SSE database 414 from unintended unauthorized data manipulation by the user's device 401.

Subsequent times 405 the user's device 401 initiates a connection with the SSE server 402, the SSE server 402 collects 407 both passive and active data from the user's device 401 comparing the received data to the previous device fingerprint stored in memory to determine if it has significantly changed from the previous session. If no substantial changes have occurred and the user is properly authenticated, a session will be established via the user's device unique device specific driver 408. Alternatively, if substantial changes in the user's device 401 are noted, a security event may be triggered resulting in possible reduced accessibility and/or another level of authentication. Additionally, significant changes in the user's device 407 fingerprint may result in the device specific driver 408 being reconfigured, restructured, or recompiled by the SSE server 402 to accommodate the user's device changes prior to the session commencing.

In a specific embodiment, the user login data and sequential device fingerprints are maintained in a blockchain 415, such that an inalterable forensic data chain is maintained, documenting all user logins with associated devices via DLT. This blockchain can be expanded to include user actions when interacting with the SSE database as well as DLT authentication data thereby enabling the concept of ownership of objects, environments, and programs created by different users. In an alternative specific embodiment, the entire SSE database or portions thereof are also maintained in blockchain 415, such that an inalterable forensic data chain documenting all or some SSE database changes are also maintained in DLT log.

After the device specific driver 408 is verified and/or modified and the session is initiated, portions of the SSE database model data 414 are transmitted to the user's device 401, preferably in a format native to the user's device 401, with some shared model portions possibly transmitted in an universal SSE database format. The user device 401 native formatted data being preferably stored in the user's device exclusive layer of the SSE database with the universal SSE database format data being stored in the shared or intersecting layers of the SSE database.

Returning to the swim lane flowchart 400 of FIG. 4A, the SSE database model data is received by the user's device 401 where the 2D data is formatted for the screen and displayed 416 (see 109' of FIG. 1B). At this point, the user may interact with the displayed model 417 (FIG. 4A) with any of the predefined commands enabled by the device specific driver 408 with some commands executed and stored locally 418 on the user's device 401 in a native application. The SSE database model 414 then responds to the user's commands 417, downloading new model data for local processing 419 on the user's device 401 resulting in a modified model display 420. This process is continued 421 until the user terminates the active session.

The FIG. 4B exemplary swim lane flowchart 430 is similar to the exemplary flowchart 400 of FIG. 4A with the FIG. 4B example employing a VR user device 431 with its unique device specific driver 443 also resident on the VR device 431. As before, flowchart 430 begins with the VR device 431 attempting to connect 433 to the SSE server 402'.

The first time 435 the user's device 431 initiates a connection with the SSE server 402', a user unique account will be created 436, uniquely authenticating both the human user's identity and the user's device 431. At this time, the SSE server 402' automatically interrogates the user's device 431 via a generic interface 404' that preferably also functions as a firewall to the SSE database 414'. Both passive and active interrogated data 437 collected from the user's device 431 are saved 413 (and optionally 415'), thereby logging the user's device 431 type, operating parameters, configuration, etc. This interrogated data 437 is utilized by the server 402' to generate the unique device specific driver 443 for the user's device 431 that is preferably compiled to run on the user's device 431 in a native format. In addition to the compiled portion, the device specific driver 443 typically also includes libraries of executable functions or data. The created device specific driver 443 functioning to filter the SSE database model data 414' to only provide the appropriate data required for the user's VR device 431 to operate as well as to isolate and protect the SSE database 414' from unintended unauthorized data manipulation by the user's device 431.

Subsequent times 435 the user's device 431 initiates a connection with the SSE server 402', the SSE server 402' collects 437 both passive and active data comparing the received data to the previous device fingerprint stored in memory to determine if the new fingerprint has significantly changed from the previous session. If no substantial changes have occurred and the user is properly authenticated, a session will be established via the user's device unique device specific driver 443. Alternatively, if substantial changes in the user's device 431 are noted, a security event may be triggered resulting in possible reduced accessibility and/or another level of authentication. Additionally or alternatively, the device specific driver 443 may be automatically reconfigured, restructured, or recompiled by the SSE server 402' to accommodate the user's device 431 changes prior to the session commencing. As before, in a specific alternative embodiment, the user login data, sequential device fingerprints, and optionally user actions are maintained in a blockchain 415', such that an inalterable forensic data chain is maintained. In an alternative specific embodiment, the entire SSE database or portions thereof are also maintained in blockchain 415', such that an inalterable forensic data chain documenting all or some SSE database changes are also maintained in DLT log.

After the device specific driver 443 is verified and/or modified and the session is initiated, portions of the SSE database model data 414' are transmitted to the user's device 431, preferably in a format native to the user's device 431, with some shared or intersecting model portions preferably transmitted in an universal SSE database format. The user device 431 native formatted data being preferably stored in a user device exclusive layer (e.g., 203 of FIG. 2) of the SSE database 200 with the universal SSE database format data being stored in the shared or intersecting layers (e.g., 202, 206, and 208 of FIG. 2) of the SSE database 200 of FIG. 2.

Returning to FIG. 4B, the SSE database model data is received 437 by the user's device 431 where the VR data is rendered by local processing 439 in 3D (i.e., different images for the left and right eye—e.g., see 107' and 108' of FIG. 1C) with regard to the position and orientation 446 (FIG. 4B) of the VR device resulting in rendered images formatted for the screen and displayed 440. At this point, the user may interact with the displayed model 441 with any of the predefined commands enabled by the device specific driver 443 with some commands executed and stored locally 438 on the user's device 431 in a native application. The SSE database model 414' then responds to the user's commands, downloading new model data for local processing 442 on the user's device 431 resulting in a modified model display 444. This process is continued 445 until the user terminates the active session.

Lastly, the FIG. 4C swim lane flowchart 450 depicts the same general exemplary SSE database model of FIG. 1A with the FIG. 4C example allowing access to a user's AR device 451. Flowchart 450 begins with the AR device 451 attempting to connect 453 to the SSE server 402".

The first time 453 the user's device 451 initiates a connection with the SSE server 402", a user unique account will be created 456, uniquely authenticating both the human user's identity and the user's device 451. At this time, the SSE server 402" automatically interrogates the user's device 451 via a generic interface 404" that preferably also functions as a firewall to the SSE database 414". Both passive and active interrogated data 457 collected from the user's device 451 are saved, thereby logging the user's device 451 type, operating parameters, configuration, etc. This interrogated data 457 is then utilized by the server 402" to generate the unique device specific driver 467 for the user's device 451 that is preferably compiled to run on the user's device 451 in a native format. In addition to the compiled portion, the device specific driver 467 typically also includes libraries of executable functions or data. The created device specific driver 467 functioning to filter the SSE database model data 414" to only provide the appropriate data required for the user's VR device 451 to operate as well as to isolate and protect the SSE database 414" from unintended unauthorized data manipulation by the user's device 451.

Subsequent times 455 the user's device 451 initiates a connection with the SSE server 402", the SSE server 402" collects 457 both passive and active data comparing the received data to the previous device fingerprint stored in memory to determine if the new fingerprint has significantly changed from the previous session. If no substantial changes have occurred and the user is properly authenticated, a session will be established via the user's device unique device specific driver 467. Alternatively, if substantial changes in the user's device 451 are noted, a security event may be triggered resulting in possible reduced accessibility and/or another level of authentication. Additionally or alternatively, the device specific driver 467 may be automatically reconfigured, restructured, or recompiled by the SSE server 402" to accommodate the user's device 451 changes prior to the session commencing. As before, in a specific alternative embodiment, the user login data, sequential device fingerprints, and optionally user actions are maintained in a blockchain 415", such that an inalterable forensic data chain is maintained. In an alternative specific embodiment, the entire SSE database or portions thereof are also maintained in blockchain 415", such that an inalterable forensic data chain documenting all or some SSE database changes are also maintained in DLT log.

After the device specific driver 467 is verified and/or modified and the session is initiated, portions of the SSE database model data 414" are transmitted to the user's device 451 preferably in a format native to the user's device 451 with some shared or intersecting model portions transmitted in an universal SSE database format. The user device 451 native formatted data being preferably stored in the device exclusive layer (e.g., 205 of FIG. 2) of the SSE database 200 with the universal SSE database format data being stored in the shared or intersecting layers (e.g., 204, 206, and 208 of FIG. 2) of the SSE database 200 of FIG. 2.

Returning to FIG. 4C, the SSE database model data is received 457 by the user's device 431 where the 3D AR data is rendered by local processing 460 flattened to the current perspective (i.e., the full 3D model is downloaded to the AR device with the model flattened or sliced to create a 2D rendering from the point of view of the AR device—see 106' of FIG. 1D) with regard to the position and orientation 458 (FIG. 4C) of the AR device. The rendered image is formatted for the AR screen and displayed 461 as a layer on top of the real world image captured 459 by the AR device's camera (e.g., 144 of FIG. 1D). At this point, the user may interact with the displayed model 462 (FIG. 4C) with any of the predefined commands enabled by the device specific driver 467 with some commands executed and stored locally 463 on the user's device 451 in a native application. The SSE database model 414" then responds to the user's commands, downloading new model data for local processing 464 on the user's device 451 resulting in a modified model display 465. This process is continued 466 until the user terminates the active session.

Thus, in the embodiments of FIGS. 4A thru 4C, pluralities of different types of devices (e.g., 2D 401 of FIG. 4A, VR 431 of FIG. 4B, and AR 451 of FIG. 4C) communicate and manipulate the same common SSE database model in a harmonious manner via pluralities of unique custom device specific drivers resident on the user devices. This embodiment has the advantages of distributed processing and consequently less complexity and processing requirements for the SSE server itself, with the disadvantages of lower security and greater communications bandwidth utilization.

Figure 5A:
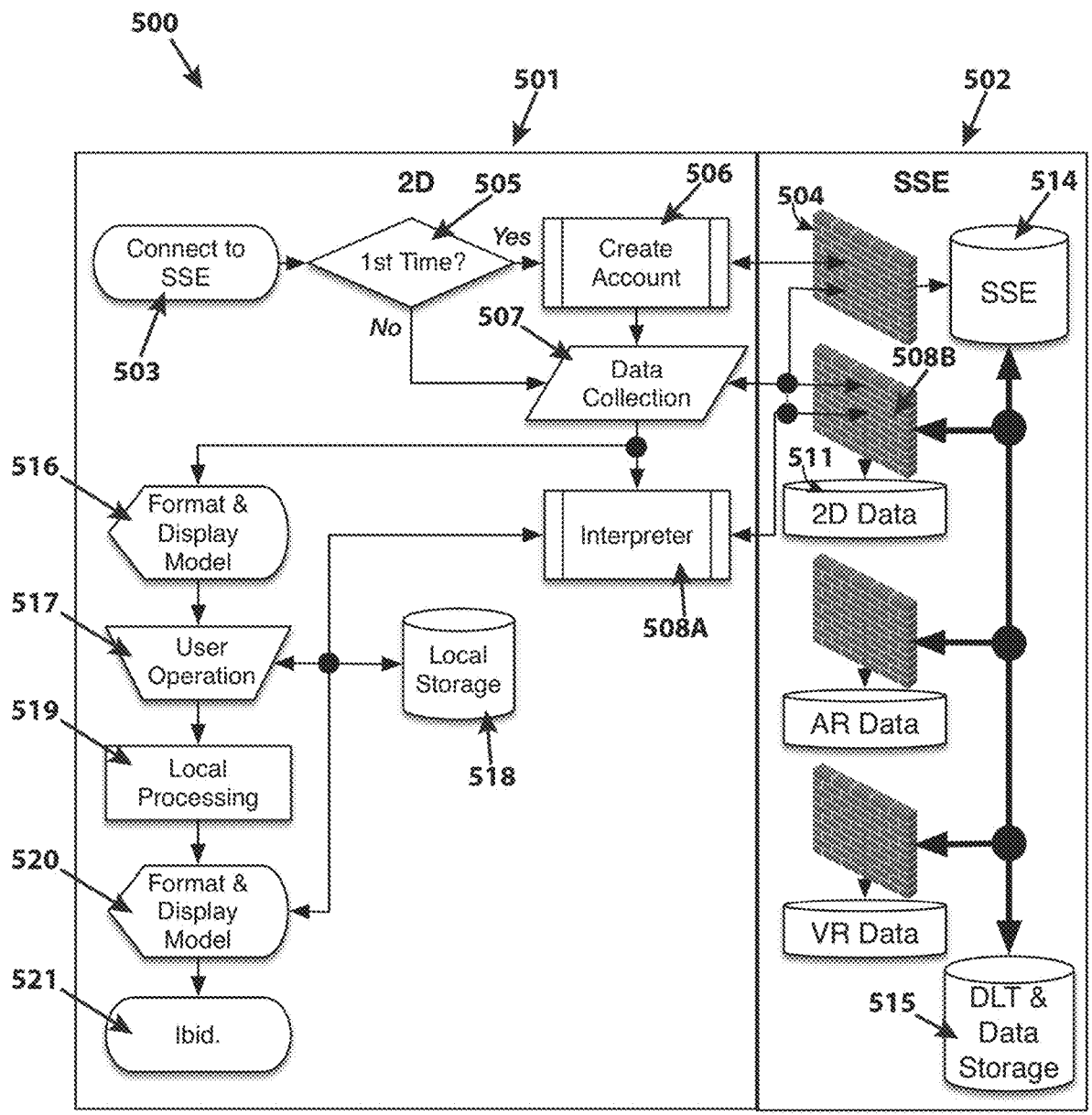
FIG. 5A is an overall swim lane flowchart representative example of the processes associated with operating and maintaining a superposition simulated environment database compatible with the specific embodiment of FIG. 1B (2D device interfacing to SSE) where portions of the device specific driver are resident on both the superposition simulated environment database's server and the user's device.
Figure 5B:
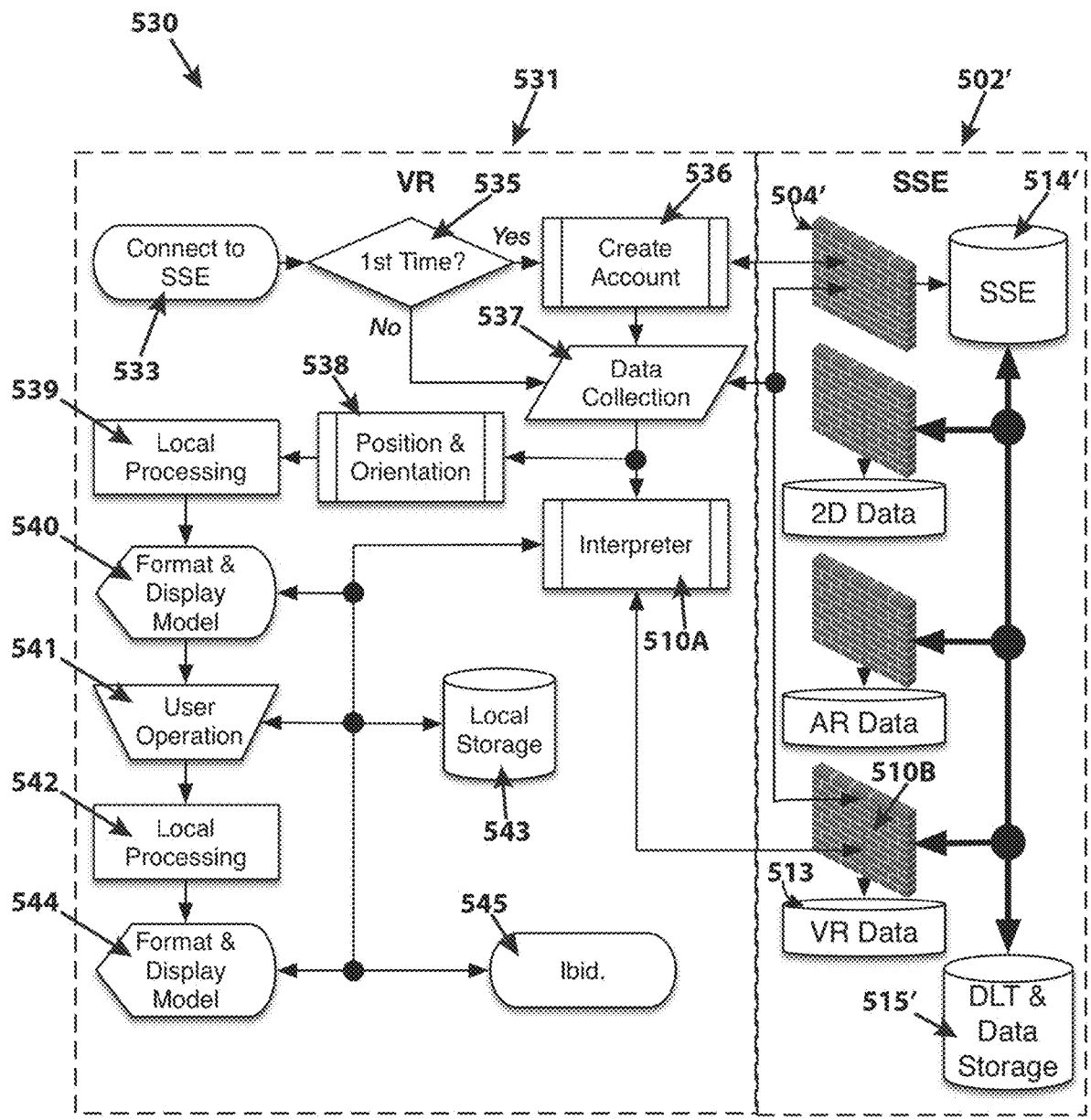
FIG. 5B is an overall swim lane flowchart representative example of the processes associated with operating and maintaining a superposition simulated environment database compatible with the specific embodiment of FIG. 1C (VR device interfacing to SSE) where portions of the device specific driver are resident on both the superposition simulated environment database's server and the user's device.
Figure 5C:
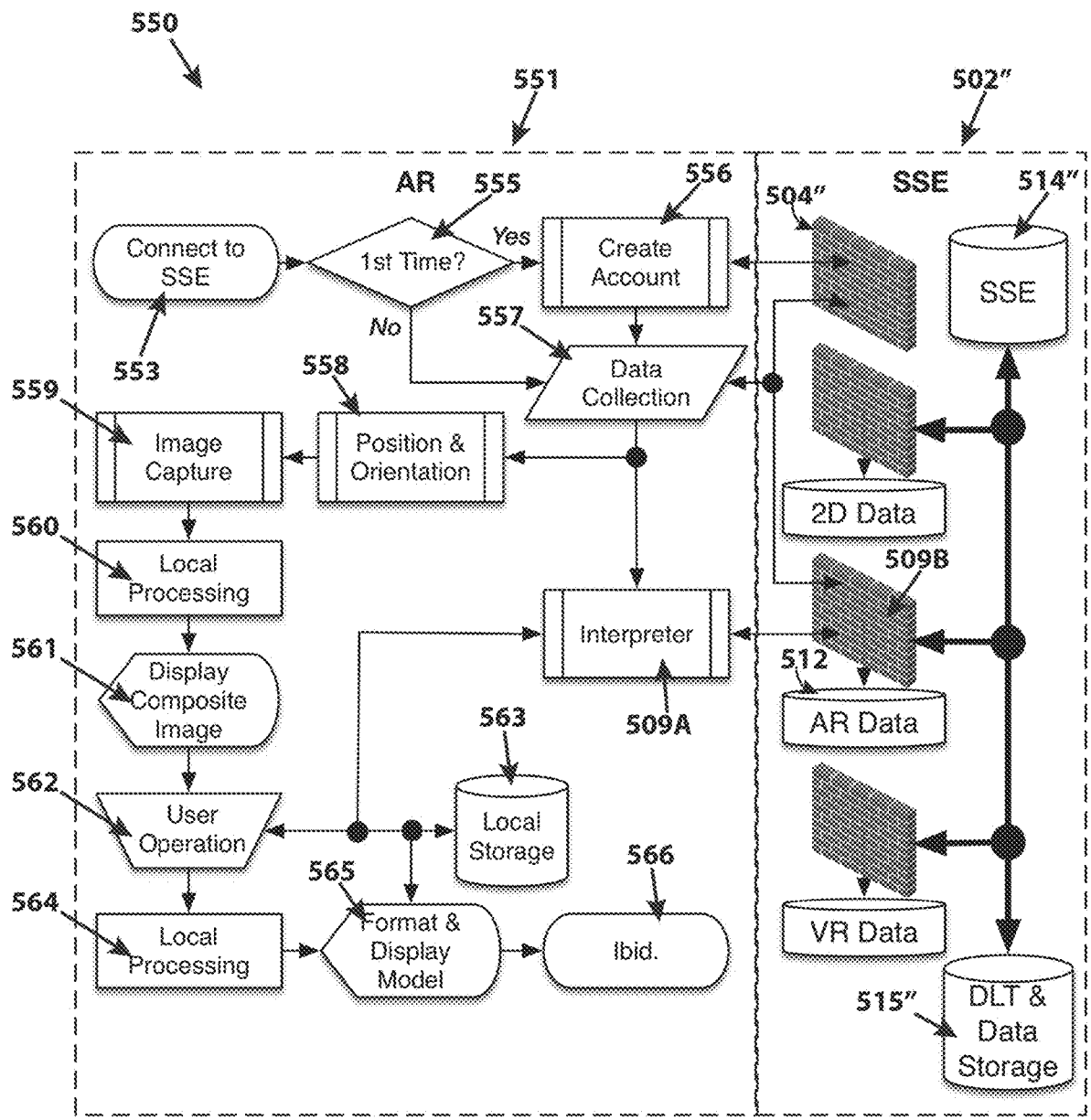
FIG. 5C is an overall swim lane flowchart representative example of the processes associated with operating and maintaining a superposition simulated environment database compatible with the specific embodiment of FIG. 1D (AR device interfacing to SSE) where portions of the device specific driver are resident on both the superposition simulated environment database's server and the user's device.

FIGS. 5A thru 5C, taken together, illustrate the embodiment of the exemplary SSE database of FIG. 1A with portions of various device specific drivers resident on both the SSE database server and the device itself. As shown in the exemplary illustrations of FIGS. 5A thru 5C, in this specific embodiment the SSE server is accessed by three different types of user devices specifically: a 2D device 501 in 500 of FIG. 5A, a VR device 531 in 530 of FIG. 5B, and an AR device 551 in 550 of FIG. 5C. All three of the FIGS. 5A thru 5C swim lane flowcharts 500, 530, and 550 are conceptually divided into two groups (i.e., device and "SSE") by the two "swim lane" columns.

The FIG. 5A swim lane flowchart 500 begins with the user's 2D device 501 initiating a connection 503 with the SSE server 502. The first time 505 the user's device 501 initiates a connection with the SSE server 502 a user account will be created 506, uniquely authenticating both the human user's identity and the user's device 501. At this time, the SSE server 502 automatically interrogates the user's device 501 via a generic interface 504 that preferably also functions as a firewall to the SSE database 514. This interrogated data 507 is utilized by the server 502 to generate the unique device specific driver 508A for the user's device 501 that is preferably compiled to run on the user's device 501 in a native format as well as associated device specific driver 508B that is preferably compiled to run on the SSE server 502 in its native format. The created device specific drivers 508A and 508B functioning to filter the SSE database model data 514 to only provide the appropriate data required for the user's 2D device 501 to operate as well as to isolate and protect the SSE database 514 from both malicious and unintended unauthorized data manipulation by the user's device 501.

Subsequent times 505 the user's device 501 initiates a connection with the SSE server 502, the SSE server 502 collects 507 both passive and active data from the user's device 501 comparing the received data to the previous device fingerprint stored in memory 511 and optionally 515 to determine if it has significantly changed from the previous session. If no substantial changes have occurred and the user is properly authenticated, a session will be established via the user's device unique device specific drivers 508A and 508B. Alternatively, if substantial changes in the user's device 501 are noted, a security event may be triggered resulting in possible reduced accessibility and/or another level of authentication. Additionally, significant changes in the user's device 507 fingerprint may result in the device specific drivers 508A and 508B being reconfigured, restructured, or recompiled by the SSE server 502 to accommodate the user's device changes prior to the session commencing.

In a specific embodiment, the user login data and sequential device fingerprints are maintained in a blockchain 515, such that an inalterable forensic data chain is maintained, documenting all user logins with associated devices via DLT. This blockchain can be expanded to include user actions when interacting with the SSE database as well as DLT authentication data thereby enabling the concept of ownership of objects, environments, and programs created by different users. In an alternative specific embodiment, the entire SSE database or portions thereof are also maintained in blockchain 515, such that an inalterable forensic data chain documenting all or some SSE database changes are also maintained in DLT log.

After the device specific driver 508A and 508B is verified and/or modified and the session is initiated, portions of the SSE database model data 514 are transmitted to the user's device 501, preferably in a format native to the user's device 501, with some shared model portions possibly transmitted in an universal SSE database format. The user device 501 native formatted data being preferably stored in the user's device exclusive layer of the SSE database with the universal SSE database format data being stored in the shared or intersecting layers of the SSE database.

The SSE database model data is received by the user's device 501 where the 2D data is formatted for the screen and displayed 516 (see 109' of FIG. 1B). At this point, the user may interact with the displayed model 517 (FIG. 5A) with any of the predefined commands enabled by the device specific drivers 508A and 508B with some commands executed and stored locally 518 on the user's device 501 in a native application. The SSE database model 514 then responds to the user's commands 517, downloading new model data for local processing 519 on the user's device 501 resulting in a modified model display 520. This process is continued 521 until the user terminates the active session.

The FIG. 5B exemplary swim lane flowchart 530 is similar to the exemplary flowchart 500 of FIG. 5A with the FIG. 5B example employing a VR user device 531 with portions of various device specific drivers resident on both the SSE database server and the device itself. As before, flowchart 530 begins with the VR device 531 attempting to connect 533 to the SSE server 502'.

The first time 535 the user's device 531 initiates a connection with the SSE server 502', a user unique account will be created 536, uniquely authenticating both the human user's identity and the user's device 531. At this time, the SSE server 502' automatically interrogates the user's device

531 via a generic interface 504' that preferably also functions as a firewall to the SSE database 514'. Both passive and active interrogated data 537 collected from the user's device 531 are saved 513 (and optionally 515'), thereby logging the user's device 531 type, operating parameters, configuration, etc. This interrogated data 537 is utilized by the server 502' to generate the unique device specific driver 510A for the user's device 531 that is preferably compiled to run on the user's device 531 in a native format as well as associated device specific driver 510B that is preferably compiled to run on the SSE server 502' in its native format. The created device specific drivers 510A and 510B functioning to filter the SSE database model data 514' to only provide the appropriate data required for the user's VR device 531 to operate as well as to isolate and protect the SSE database 514' from both malicious and unintended unauthorized data manipulation by the user's device 531.

Subsequent times 535 the user's device 531 initiates a connection with the SSE server 502', the SSE server 502' collects 537 both passive and active data comparing the received data to the previous device fingerprint stored in memory to determine if the new fingerprint has significantly changed from the previous session. If no substantial changes have occurred and the user is properly authenticated, a session will be established via the user's device unique device specific drivers 510A and 510B. Alternatively, if substantial changes in the user's device 531 are noted, a security event may be triggered resulting in possible reduced accessibility and/or another level of authentication. Additionally or alternatively, device specific drivers 510A and 510B may be automatically reconfigured, restructured, or recompiled by the SSE server 502' to accommodate the user's device 531 changes prior to the session commencing. As before, in a specific alternative embodiment, the user login data, sequential device fingerprints, and optionally user actions are maintained in a blockchain 515', such that an inalterable forensic data chain is maintained. In an alternative specific embodiment, the entire SSE database or portions thereof are also maintained in blockchain 515', such that an inalterable forensic data chain documenting all or some SSE database changes are also maintained in DLT log.

After the device specific drivers 510A and 510B are verified and/or modified and the session is initiated, portions of the SSE database model data 514' are transmitted to the user's device 531, preferably in a format native to the user's device 531, with some shared or intersecting model portions preferably transmitted in an universal SSE database format. The user device 531 native formatted data being preferably stored in a user device exclusive layer (e.g., 203 of FIG. 2) of the SSE database 200 with the universal SSE database format data being stored in the shared or intersecting layers (e.g., 202, 206, and 208 of FIG. 2) of the SSE database 200 of FIG. 2.

Returning to FIG. 5B, the SSE database model data is received 537 by the user's device 531 where the VR data is rendered by local processing 539 in 3D (i.e., different images for the left and right eye—e.g., see 107' and 108' of FIG. 1C) with regard to the position and orientation 538 (FIG. 5B) of the VR device resulting in rendered images formatted for the screen and displayed 540. At this point, the user may interact with the displayed model 541 with any of the predefined commands enabled by the device specific drivers 510A and 510B with some commands executed and stored locally 538 on the user's device 531 in a native application. The SSE database model 514' then responds to the user's commands, downloading new model data for local processing 542 on the user's device 531 resulting in a modified model display 544. This process is continued 545 until the user terminates the active session.

Finally, the FIG. 5C swim lane flowchart 550 depicts the same general exemplary SSE database model of FIG. 1A with the FIG. 5C example allowing access to a user's AR device 551. Flowchart 550 begins with the AR device 551 attempting to connect 553 to the SSE server 502".

The first time 555 the user's device 551 initiates a connection with the SSE server 502", a user unique account will be created 556, uniquely authenticating both the human user's identity and the user's device 551. At this time, the SSE server 502" automatically interrogates the user's device 551 via a generic interface 504" that preferably also functions as a firewall to the SSE database 514". Both passive and active interrogated data 557 collected from the user's device 551 are saved 512 and optionally 515", thereby logging the user's device 551 type, operating parameters, configuration, etc. This interrogated data 557 is utilized by the server 502" to generate the unique device specific driver 509A for the user's device 551 that is preferably compiled to run on the user's device 551 in a native format as well as associated device specific driver 509B that is preferably compiled to run on the SSE server 502" in its native format. The created device specific drivers 509A and 509B functioning to filter the SSE database model data 514" to only provide the appropriate data required for the user's AR device 551 to operate as well as to isolate and protect the SSE database 514" from both malicious and unintended unauthorized data manipulation by the user's device 551.

Subsequent times 555 the user's device 551 initiates a connection with the SSE server 502", the SSE server 502" collects 557 both passive and active data comparing the received data to the previous device fingerprint stored in memory to determine if the new fingerprint has significantly changed from the previous session. If no substantial changes have occurred and the user is properly authenticated, a session will be established via the user's device unique device specific drivers 509A and 509B. Alternatively, if substantial changes in the user's device 551 are noted, a security event may be triggered resulting in possible reduced accessibility and/or another level of authentication. Additionally or alternatively, the device specific drivers 509A and 509B may be automatically reconfigured, restructured, or recompiled by the SSE server 502" to accommodate the user's device 551 changes prior to the session commencing. As before, in a specific alternative embodiment, the user login data, sequential device fingerprints, and optionally user actions are maintained in a blockchain 515", such that an inalterable forensic data chain is maintained. In an alternative specific embodiment, the entire SSE database or portions thereof are also maintained in blockchain 515", such that an inalterable forensic data chain documenting all or some SSE database changes are also maintained in DLT log.

After the device specific drivers 509A and 509B are verified and/or modified and the session is initiated, portions of the SSE database model data 514" are transmitted to the user's device 551 preferably in a format native to the user's device 551 with some shared or intersecting model portions transmitted in an universal SSE database format. The user device 551 native formatted data being preferably stored in the device exclusive layer (e.g., 205 of FIG. 2) of the SSE database 200 with the universal SSE database format data being stored in the shared or intersecting layers (e.g., 204, 206, and 208 of FIG. 2) of the SSE database 200 of FIG. 2.

Returning to FIG. 5C, the SSE database model data is received 557 by the user's device 551 where the 3D AR data is rendered by local processing 560 flattened to the current perspective (i.e., the full 3D model is downloaded to the AR device with the model flattened or sliced to create a 2D rendering from the point of view of the AR device—see 106' of FIG. 1D) with regard to the position and orientation 558 (FIG. 5C) of the AR device. The rendered image is formatted for the AR screen and displayed 561 as a layer on top of the real world image captured 559 by the AR device's camera (e.g., 144 of FIG. 1D). At this point, the user may interact with the displayed model 562 (FIG. 5C) with any of the predefined commands enabled by the device specific drivers 509A and 509B with some commands executed and stored locally 563 on the user's device 551 in a native application. The SSE database model 514" then responds to the user's commands, downloading new model data for local processing 564 on the user's device 551 resulting in a modified model display 565. This process is continued 566 until the user terminates the active session.

Figure 6:
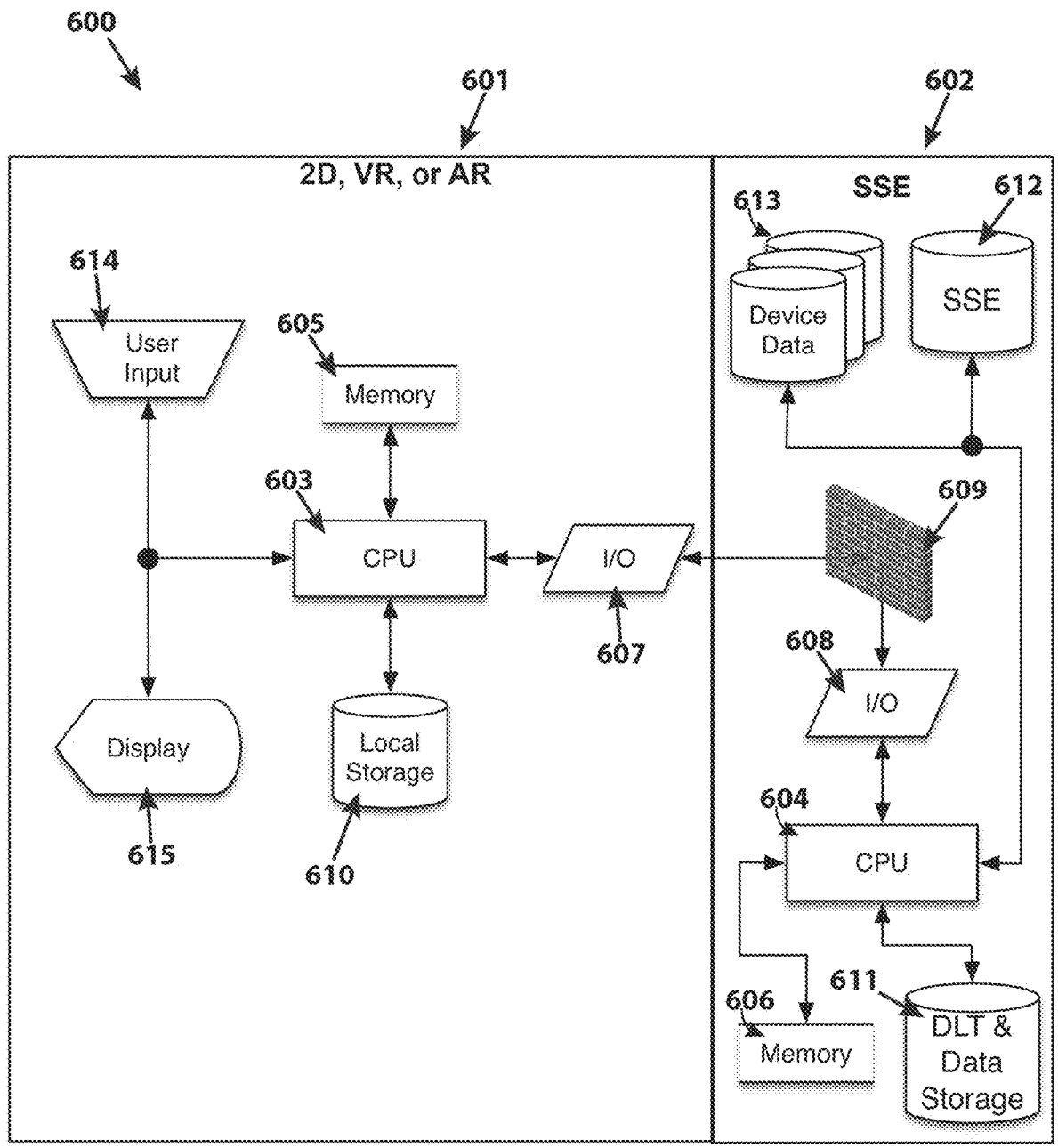
FIG. 6 is a representative example swim lane hardware block diagram of a SSE supporting 2D, VR, and AR embodiments as enabled by the present invention.

The related FIG. 6 swim lane system hardware architecture diagram 600 features a generic SSE 602 interfacing to various user devices 601 of the present invention. A generic user device hardware block diagram 601 is provided, since from the perspective of the SSE 602, all user devices fulfill the same generic hardware functionality—i.e., Central Processing Unit (CPU) 603, memory 605, non-volatile memory of storage 610, and Input/Output (I/O) 607—with only the user inputs 614 and display(s) 615 varying by device—e.g., flat screen display, touch pad and keyboard user input for 2D device; dual goggled displays and hand gestures user input for VR device; flat screen display and touch screen user input for AR device.

The SSE 602 provides the transaction portal(s) that interact with the specific user devices 601, thereby enabling common interactions with the SSE database 612. All specific user commands and telemetry and displays transmitted from or to the user's device I/O 607 are routed through at least one SSE local firewall 609 prior to interacting with the SSE I/O 608. The SSE's CPU 604 and associated memory 606 processing the user I/O 607, thereby enabling access to the SSE database 612. Specific device data (e.g., driver, fingerprints) are also maintained at the SSE 602 on local non-volatile memory 613 along with optional (e.g., DLT) non-volatile data storage 611.

Thus, in the embodiments of FIGS. 5A thru 5C and FIG. 6, pluralities of different types of devices (e.g., 2D 501 of FIG. 5A, VR 531 of FIG. 5B, and AR 551 of FIG. 5C) communicate and manipulate the same common SSE database model in a harmonious manner via pluralities of unique custom device specific drivers resident on the user devices. This preferred embodiment has the combined advantages of partially distributed processing and consequently less complexity and processing requirements for the SSE server itself while at the same time maintaining higher security with lesser communications bandwidth utilization.

Control and possible modifications of the common SSE database model by the users and optionally an administrator can be typically achieved through standard user interfaces (e.g., keyboard and mouse or touch pad in the 2D embodiment 120 of FIG. 1B, hand gestures or handheld controllers in the VR embodiment 130 of FIG. 1C, touchscreen in the AR embodiment 140 of FIG. 1D). However, the varying types of user devices and associated control mechanisms, create unique challenges to provide human ergonomic control and monitoring for each type of device accessing the common SSE database model. Of course, unique ergonomic user interfaces may be incorporated for each device type, though in a preferred embodiment an universal user interface may be established that offers the same basic ergonomic interface to each user regardless of the device platform—a.k.a. "Maestro" (Multiple Applications of Ergonomic Standard Telemetry and Regulator Operating) interface.

Figure 7A:
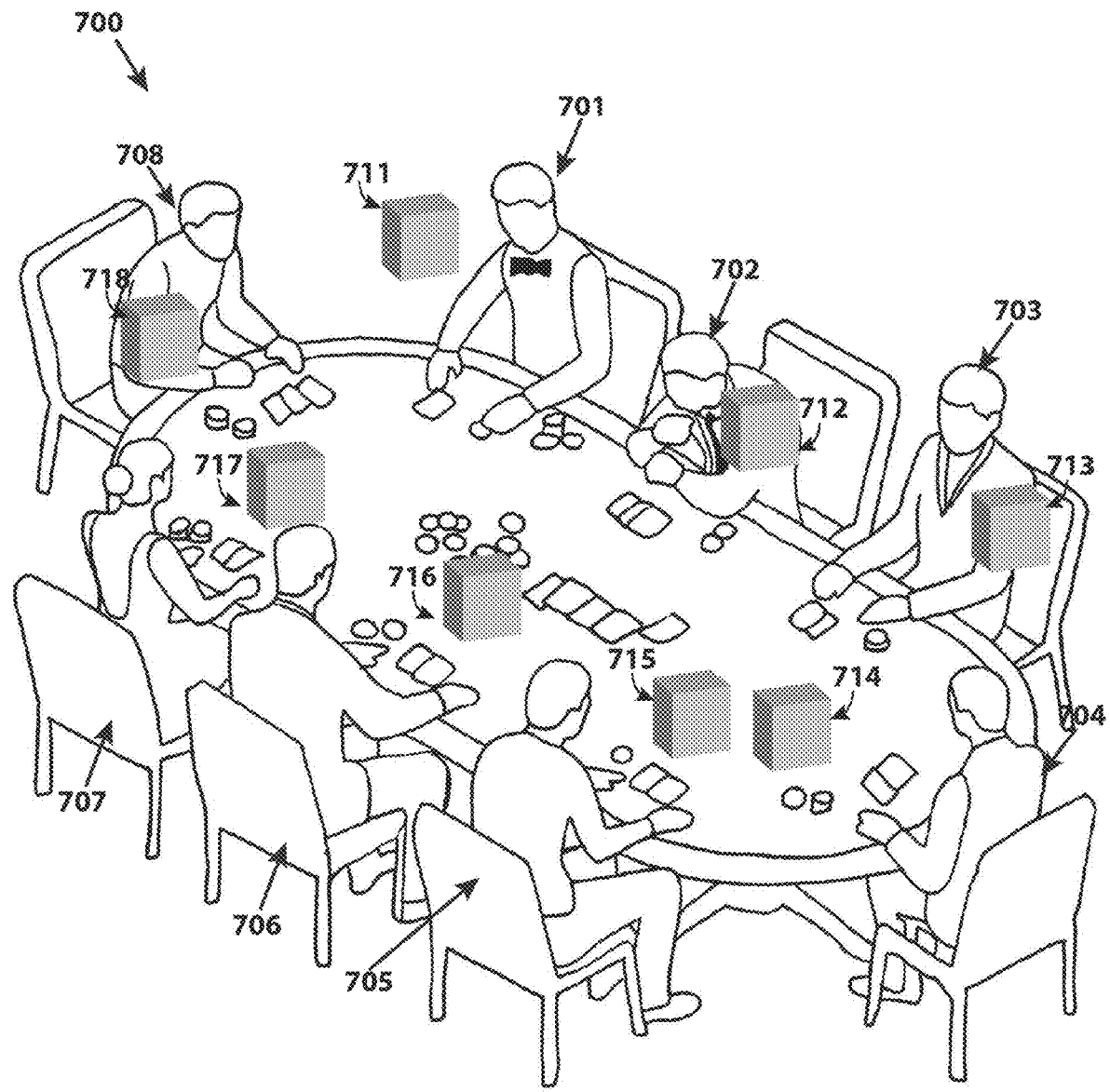
FIG. 7A is a representative example isometric view of the "Maestro" (Multiple Applications of Ergonomic Standard Telemetry and Regulator Operating) interface interacting, via a virtual poker game, with a plurality of different platform user devices.
Figure 7B:
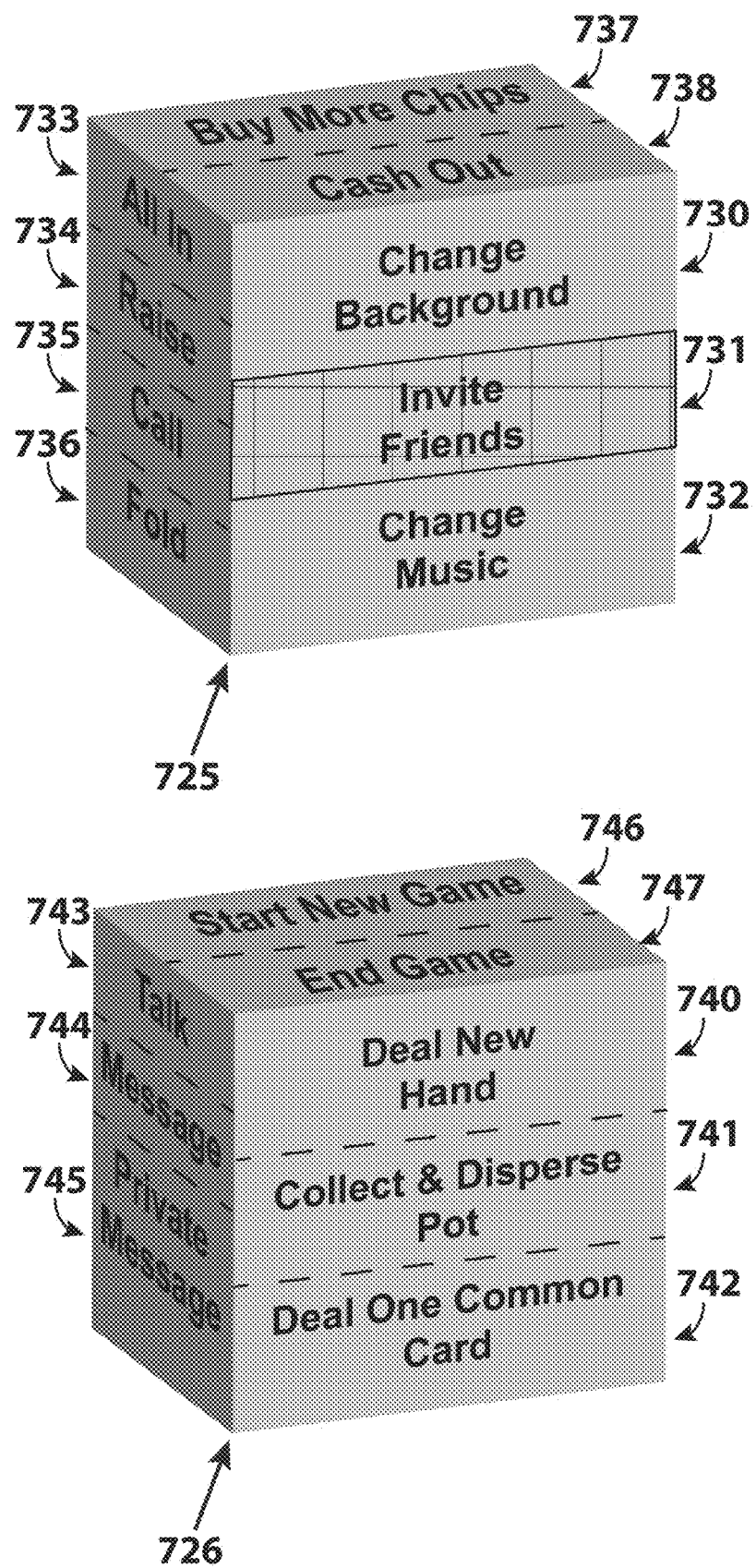
FIG. 7B is a three-dimensional conceptual illustration of the Maestro interface.
Figure 7C:
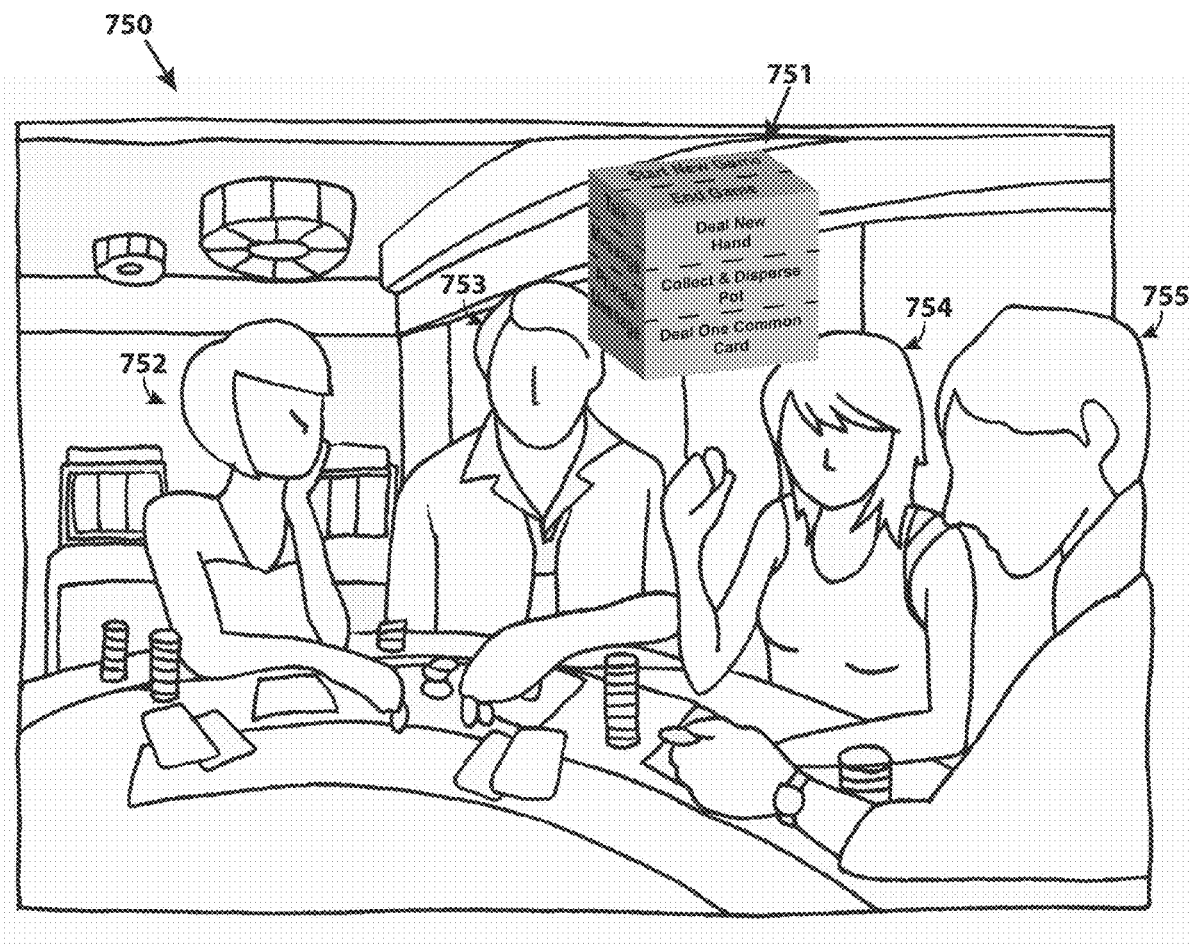
FIG. 7C is a representative example isometric view of the "Maestro" interface interacting, via a virtual poker game, from the dealer's (administrator's) perspective.

FIGS. 7A, 7B, and 7C taken together, illustrate the embodiment of the exemplary SSE with a Maestro user interface thereby enabling generic user control independent of the user's device type. FIG. 7A provides a conceptual overview 700 of a virtual poker game with an administrator 701 displayed as a dealer avatar along with seven players (702 thru 708) each with their own chosen avatars. Also illustrated in FIG. 7A are Maestro user interface control blocks or cubes (711 thru 718), with each Maestro cube only visible to its associated user. FIG. 7B provides a detailed magnification of two different types of Maestro cubes of FIGS. 7A and 7C one type configured for the players 725 and one type configured for the administrator or dealer 726. Finally, FIG. 7C provides an exemplary illustration 750 of the display of the dealer or administrator.

The conceptual overview 700 of FIG. 7A provides an overhead perspective of an ongoing virtual poker game with seven different players (702 thru 708) each being displayed with their own chosen avatar and the human administrator 701 being displayed is a dealer avatar. As shown in FIG. 7A, each player (702 thru 708) and the administrator 701 has their own associated Maestro interface (displayed as virtual cubes 711 thru 718—detailed magnified views of the Maestro cubes are provided in FIG. 7B). However, it should be noted that while the overhead example of FIG. 7A displays all eight individual player and administrator Maestro interfaces (711 thru 718), typically only each player's or administrator's Maestro interface will be visible to each perspective with all other Maestro interfaces not visible. To ensure universal device compatibility and ergonomic functionality, each individual Maestro interface is superimposed over the generated display in a floating and user movable format. While Maestro interfaces can be displayed as a flat 2D menu, in a preferred embodiment each Maestro interface is displayed as a simulated 3D shape (cube as illustrated in 700) thereby providing greater option selection density while minimizing the obstruction of the user's view. The simulated 3D Maestro interface is projected or graphed onto a 2D screen ensuring compatibility with all types of user devices—e.g., 2D computer screens, VR dual goggled displays, AR flat displays.

The Maestro interfaces in 3D cube form for the virtual poker game of FIG. 7A are illustrated in the detailed magnified views of FIG. 7B with cube 725 illustrating an example of a player's interface and cube 726 providing an example of an administrator's or dealer's interface. Typically, each Maestro interface will be customizable to the user's preferences with 3D embodiments rotatable to enable access to unseen sides, thereby allowing user access to a higher number of options in a limited space than would be possible in a usual 2D menu interface format.

Focusing now on the player Maestro interface example cube 725, the six (three shown and three not shown in FIG. 7B) sides of the Maestro interface cube are preferably arranged with related options occupying the same virtual side—e.g., environmental options (730 and 732) and invitation option 731 (shown highlighted) occupying the direct facing side; play options for a given hand (733 thru 736) all occupying the left visible side; and two financial transaction options (737 and 738) occupying the virtual top. As also illustrated in FIG. 7B, the Maestro interface cubes are preferably illustrated with simulated lighting illuminating the front facing side with the other two visible sides being partially illustrated in shadow. In this preferred embodiment, only the directly illuminated side would be enabled for user selection with the shaded and non-visible sides not enabled for user selection. By only enabling one side of the 3D Maestro interface for user selection at a time, false accepts of unintended user actuations will be greatly reduced with rotation of the virtual 3D Maestro interface thereby enhanced. If desired, multiple 3D Maestro interface objects may be added to the display; however, this increase in user options has the disadvantage of increased clutter and less visibility. Of course, if multiple 3D Maestro interface objects are desired, the user may be provided with the ability to minimize or vanish unneeded 3D Maestro interface objects, but this has the disadvantages of potentially confusing the user and obscuring potential options. As a preferred alternate embodiment, 3D Maestro interface object shapes may be employed (e.g., sphere) where (similar to a scroll wheel) a large number of options may be made available by adding and subtracting options on the unseen side dynamically as the user rotates the Maestro interface object. While this technique is theoretically possible with Maestro interface objects with a finite number of virtual sides (e.g., six sided cubes) it is counterintuitive and potentially confusing to a human user, however with Maestro interface objects with no obvious finite number of sides (e.g., sphere) the addition of options beyond the normal geometric limits does not necessarily create confusion so long as the number of options are reasonably limited. Regardless of the 3D Maestro interface object shape or form, the user will be able to intuitively manipulate and select options via well-known control mechanisms inherent in the type of device they are using. For example, for users with a 2D laptop screen and mouse or touchpad would allow selection of any facing option with positioning enabled by dragging, and rotation enabled by shift dragging.

The administrator's or dealer's Maestro interface object cube 726 is conceptually similar to the player's Maestro interface object cube 725 with different options available to the administrator or dealer. For example, the Maestro interface object cube's 725 facing side includes options (740 thru 742) for controlling each poker hand with the left side including options (743 thru 745) for communicating with the various players and the top including options (746 and 747) for beginning and ending a poker game.

While FIG. 7A provided an overall overhead perspective 700 of a virtual poker game, FIG. 7C provides an individual (dealer's) perspective 750 that is more typical if regular usage. As shown in perspective 750, the virtual elevation is lowered to table level with only a subset of the players (752 thru 755) avatars visible at one time, thereby allowing more detailed renditions (e.g., card faces) to be apparent. As previously discussed, the only Maestro interface object cube 751 (magnified view 726 provided in FIG. 7B) that is visible is the interface associated with the user's perspective.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A virtual user interface for a user-controlled device that allows a person who interacts with the user-controlled device to make user selections from a plurality of selection options to interact with, and control actions performed in, a simulated environment in which the virtual user interface resides, the virtual user interface being a virtual three-dimensional user interface object having the plurality of selection options on its outer surface, wherein the plurality of selection options is distributed over different portions of the outer surface of the virtual three-dimensional user interface object, the plurality of selection options being grouped into a plurality of subsets of selection options, and wherein the virtual three-dimensional user interface object is rotatable by user interaction of the person with the virtual three-dimensional user interface object to a predefined position in space that causes one of the subsets of selection options to be in focus, thereby enabling the selection options of the subset in focus to be enabled for user selection, the remaining subsets of selection options not being in focus and thus not being enabled for user selection, and wherein each of the selection options in one of the subsets of selection options that is in focus are enabled from user selection without needing to further rotate the virtual three-dimensional user interface object, and wherein each selection option in one of the subsets of selection options controls the simulated environment, and causes control of a different action to be performed in the simulated environment than the actions performed by the other selection options in the same subset of selection options, thereby enabling the person to control actions performed in the simulated environment in which the virtual user interface resides.

2. The user interface of claim 1 wherein the virtual three-dimensional user interface object is a rectangular box, and each subset of selection options appear on a different face of the rectangular box.

3. The user interface of claim 2 wherein the rectangular box is a cube.

4. The user interface of claim 1 wherein the virtual three-dimensional user interface object is spherical.

5. The user interface of claim 1 wherein one or more of the subsets of selection options which are not in focus are visible to the person, and one or more of the subsets of selection options which are not in focus are not visible to the person.

6. The user interface of claim 1 wherein the subset of selection options that are in focus most directly face the person.

7. The user interface of claim 1 wherein the subset of selection options that are in focus have greater illumination than any of the subsets of selection options that are not in focus.

8. The user interface of claim 1 wherein the subset of selection options that are in focus have greater illumination than any of the subsets of selection options that are not in focus, and wherein the virtual three-dimensional user interface object is a rectangular box, and each subset of selection options appear on a different face of the rectangular box, and wherein the subset of selection options that are in focus and have greater illumination than any of the subsets of selection options that are not in focus appear on a front-facing side of the rectangular box.

9. A system for providing a simulated environment that allows a plurality of user-controlled devices of different device types to interact with, and control actions performed in, a simulated environment while maintaining device-type individual perspectives, the types of devices including at least two of the following different device types: (i) Virtual Reality (VR), (ii) Augmented Reality (AR), and (iii) two-dimensional (2D), the system comprising:

(a) a server that maintains the simulated environment as a multidimensional database, the multidimensional database in the server storing one or more virtual three-dimensional user interface objects; and (b) a plurality of virtual user interfaces, each virtual user interface being used for one of the user-controlled devices of different device types, the plurality of virtual user interfaces being generated by the server, the plurality of virtual user interfaces allowing a person who interacts with their respective user-controlled device to make user selections from a plurality of selection options to interact with a simulated environment, the virtual user interface being an instance of one of the virtual three-dimensional user interface objects, each instance of one of the virtual three-dimensional user interface objects having the plurality of selection options on its outer surface, the plurality of selection options being visible to only the person who interacts with the respective user-controlled device, wherein the server generates the same virtual user interface for user-controlled devices of different device types, and wherein the plurality of selection options is distributed over different portions of the outer surface of each instance of the virtual three-dimensional user interface object, the plurality of selection options being grouped into a plurality of subsets of selection options, and wherein each instance of the virtual three-dimensional user interface object is rotatable by user interaction of the person with their respective instance of the virtual three-dimensional user interface object to a predefined position in space that causes one of the subsets of selection options to be in focus, thereby enabling the selection options of the subset in focus to be enabled for user selection, the remaining subsets of selection options not being in focus and thus not being enabled for user selection, and wherein each of the selection options in one of the subsets of selection options that is in focus are enabled from user selection without needing to further rotate the virtual three-dimensional user interface object, and wherein each selection option in one of the subsets of selection options controls the simulated environment and causes control of a different action to be performed in the simulated environment than the actions performed by the other selection options in the same subset of selection options.

10. The system of claim 9 wherein the instances of the virtual three-dimensional user interface objects are rectangular boxes, and each subset of selection options appear on a different face of the rectangular box.

11. The system of claim 10 wherein the rectangular box is a cube.

12. The system of claim 9 wherein the instances of the virtual three-dimensional user interface objects are spherical.

13. The system of claim 9 wherein the selection options of each instance of the virtual three-dimensional user interface objects for a plurality of different user-controlled devices are the same.

14. The system of claim 9 wherein the selection options of each instance of the virtual three-dimensional user interface objects for a plurality of different user-controlled devices are different.

15. The system of claim 9 wherein one or more of the subsets of selection options which are not in focus are visible to the person, and one or more of the subsets of selection options which are not in focus are not visible to the person.

16. The system of claim 9 wherein the subset of selection options that are in focus most directly face the person.

17. The system of claim 9 wherein the subset of selection options that are in focus have greater illumination than any of the subsets of selection options that are not in focus.

* * * * *